US008754159B2

(12) United States Patent
Miyazaki

(10) Patent No.: US 8,754,159 B2
(45) Date of Patent: *Jun. 17, 2014

(54) TIRE

(75) Inventor: Toru Miyazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 13/386,322

(22) PCT Filed: Jul. 21, 2010

(86) PCT No.: PCT/JP2010/062244
§ 371 (c)(1),
(2), (4) Date: Mar. 8, 2012

(87) PCT Pub. No.: WO2011/010662
PCT Pub. Date: Jan. 27, 2011

(65) Prior Publication Data
US 2012/0172491 A1 Jul. 5, 2012

(30) Foreign Application Priority Data

Jul. 22, 2009 (JP) .................................. 2009-171310

(51) Int. Cl.
B60C 1/00 (2006.01)
C08K 3/36 (2006.01)
C08L 7/00 (2006.01)

(52) U.S. Cl.
CPC ... B60C 1/00 (2013.01); C08K 3/36 (2013.01); C08L 7/00 (2013.01)
USPC ......... 524/493; 524/492; 524/572; 524/575.5

(58) Field of Classification Search
USPC ................. 524/492, 493, 572, 575.5
See application file for complete search history.

(56) References Cited

U.S. PATENT DOCUMENTS

| | | | |
|---|---|---|---|
| 5,409,969 A | 4/1995 | Hamada | |
| 5,496,883 A | 3/1996 | Hamada | |
| 6,022,923 A | 2/2000 | Araki et al. | |
| 6,727,307 B2 | 4/2004 | Kondo et al. | |
| 6,815,487 B2 | 11/2004 | Robert et al. | |
| 7,250,463 B2 * | 7/2007 | Durel et al. | 524/492 |
| 7,396,870 B2 | 7/2008 | Robert et al. | |
| 7,642,322 B2 | 1/2010 | Ozawa et al. | |
| 7,781,533 B2 | 8/2010 | Ozawa et al. | |
| 8,273,820 B2 * | 9/2012 | Hoshino et al. | 524/494 |
| 2002/0156169 A1 | 10/2002 | Kondo et al. | |
| 2003/0195288 A1 | 10/2003 | Robert et al. | |
| 2004/0110889 A1 | 6/2004 | Yagi et al. | |
| 2004/0220315 A1 | 11/2004 | Robert et al. | |
| 2005/0004297 A1 | 1/2005 | Durel et al. | |
| 2005/0070672 A1 | 3/2005 | Ozawa et al. | |
| 2006/0004131 A1 | 1/2006 | Ozawa et al. | |
| 2008/0269380 A1 | 10/2008 | Mamiya et al. | |
| 2010/0099826 A1 | 4/2010 | Ozawa et al. | |
| 2010/0280173 A1 | 11/2010 | Ozawa et al. | |
| 2011/0207847 A1 | 8/2011 | Sasaka et al. | |
| 2012/0046413 A1 * | 2/2012 | Sasaka | 524/575 |
| 2012/0220693 A1 * | 8/2012 | Matsuo et al. | 523/157 |

FOREIGN PATENT DOCUMENTS

| | | |
|---|---|---|
| CN | 1541245 A | 10/2004 |
| EP | 0638610 A1 | 2/1995 |
| EP | 1 426 409 A1 | 6/2004 |
| EP | 1 958 986 A1 | 8/2008 |
| JP | 03-252431 A | 11/1991 |
| JP | 6-29338 B2 | 4/1994 |
| JP | 06-157825 A | 6/1994 |
| JP | 06-248116 A | 9/1994 |
| JP | 07-070369 A | 3/1995 |
| JP | 08-245838 A | 9/1996 |
| JP | 11-029603 A | 2/1999 |
| JP | 2002-201310 A | 7/2002 |
| JP | 2003-113202 A | 4/2003 |
| JP | 2003-534426 A | 11/2003 |
| JP | 2004-513987 A | 5/2004 |
| JP | 2005-500420 A | 1/2005 |
| JP | 2006-037046 A | 2/2006 |
| JP | 2007-138069 A | 6/2007 |
| JP | 2007-326990 A | 12/2007 |
| WO | 03/046020 A1 | 6/2003 |
| WO | 2009/084667 A1 | 7/2009 |
| WO | WO 2009/091057 A1 | 7/2009 |
| WO | WO 2009/133936 A1 | 11/2009 |

OTHER PUBLICATIONS

Machine translation of JP 2007-326990 A, Dec. 20, 2007.*
Translation of the International Preliminary Report on Patentability issued Feb. 16, 2012 in International Application No. PCT/JP2010/062244 to Bridgestone Corporation.

* cited by examiner

Primary Examiner — Vickey Nerangis
(74) Attorney, Agent, or Firm — Sughrue Mion, PLLC

(57) ABSTRACT

In order to provide a tire which is excellent in processability and which is excellent as well in a low fuel consumption, abrasion resistance and fracture resistance, assumed is such a constitution that used for a tire member is a rubber composition which contains a modified natural rubber having a polar group in the rubber molecule and precipitated silica, wherein a cetyltrimethylammonium bromide-adsorbing specific surface area (CTAB) (m²/g) of the precipitated silica and the mode $A_{ac}$ in diameters (nm) of primary aggregates thereof determined by acoustic measurement of particle size distribution satisfy an equation: $A_{ac} \geq -0.76 \times (CTAB) + 274$.

9 Claims, 1 Drawing Sheet

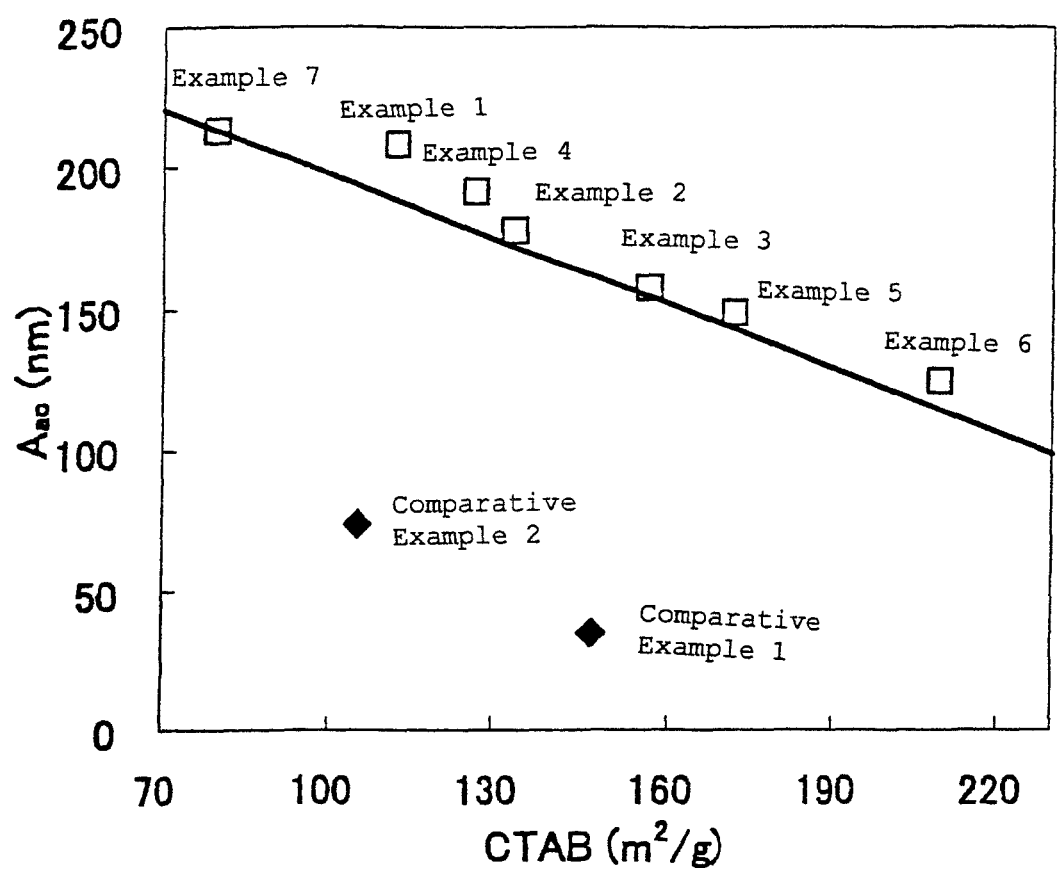

TIRE

CROSS REFERENCE TO RELATED APPLICATIONS

This application is a National Stage of International Application No. PCT/JP2010/062244 filed Jul. 21, 2010, claiming priority based on Japanese Patent Application No. 2009-171310 filed Jul. 22, 2009, the contents of all of which are incorporated herein by reference in their entirety.

TECHNICAL FIELD

The present invention relates to a tire which is excellent in low heat build-up, abrasion resistance and processability, more specifically to a tire in which a rubber composition containing precipitated silica having a specific structure as a reinforcing filler and a modified natural rubber as a rubber component is used for a tire member and which is excellent in low heat build-up, abrasion resistance and processability.

BACKGROUND ART

Carbon black has so far been used as a reinforcing filler for rubber. This is because carbon black can provide rubber compositions with high abrasion resistance. In recent years, as resource saving and energy saving are socially requested, low heat build-up of tire rubber has come to be requested as well at the same time for the purpose of saving fuel consumption of cars. When low heat build-up is intended to be achieved by using carbon black alone, it is consider that a compounding amount of carbon black is reduced or that carbon black having a large particle diameter is used, but it is known that in both cases, the reinforcing property, the abrasion resistance and the grip on a wet road are not prevented from being reduced. On the other hand, it is known to use silica as a filler in order to enhance low heat build-up (refer to, for example, patent documents 1 to 4). However, particles of silica tend to be coagulated by virtue of a hydrogen bond of a silanol group which is a surface functional group of silica, and a silanol group is not good in wettability with a rubber molecule due to a —OH group having hydrophilicity to deteriorate dispersion of silica into rubber. The kneading time has to be extended in order to improve the above problem. Also, a Mooney viscosity of a rubber composition is elevated due to insufficient dispersion of silica into rubber, and the defect that the rubber composition is inferior in processability such as extrusion has been involved therein. Further, since a surface of a silica particle is acidic, silica adsorbs a basic substance used as a vulcanization accelerator in vulcanizing a rubber composition to prevent the rubber composition from being sufficiently vulcanized, so that the defect that the elastic modulus is not enhanced has been involved therein as well.

A silane coupling agent has been developed in order to improve the above defects, but dispersion of silica has not yet reached a sufficiently high level, and it has been particularly difficult to obtain industrially good dispersion of silica particles. Accordingly, it is tried to mix silica whose surface is treated with a hydrophobicity-providing agent to accelerate reaction of a silane coupling agent (refer to, for example, patent document 1).

Further, it is disclosed in patent document 5 to use hydrophobic precipitated silica. However, since precipitated silica subjected to complete hydrophobicity treatment is used, surface silanol groups to react with a silane coupling agent disappear, and therefore the defect that rubber is not sufficiently reinforced has been involved therein. Further, silica having an increased particle diameter is used in order to improve low heat build-up, but silica is reduced in a specific surface area by increasing a particle diameter to deteriorate a reinforcing property thereof. It is disclosed in patent document 6 to use silica having a specific form, but low heat build-up and abrasion resistance of the rubber composition are not sufficiently high.

On the other hand, requirement to reduction in fuel consumption of cars is being increased in recent years, and tires having small rolling resistance are required. Accordingly, rubber compositions which have low tan δ (hereinafter referred to as a low hysteresis) and which are excellent in low heat build-up are required as rubber compositions used for a tread and the like in tires. Further, rubber compositions used for a tread are required to be excellent in abrasion resistance and a breaking characteristic in addition to a low hysteresis from the viewpoints of the safety and the economical efficiency. In contrast with this, in order to improve a low hysteresis, abrasion resistance and a breaking characteristic of a rubber composition prepared by compounding a rubber component with a reinforcing filler such as carbon black, silica, it is effective to enhance affinity between the reinforcing filler and the rubber component in the rubber composition.

For example, synthetic rubbers which are improved in affinity with a reinforcing filler by modification of a polymer end (refer to, for example, patent documents 7, 8, 9, 10 and 11) and synthetic rubbers which are improved in affinity with a reinforcing filler by modification of the main chain (refer to, for example, patent documents 12 and 13) are developed in order to enhance affinity between a reinforcing filler and a rubber component in a rubber composition to improve the reinforcing effect by the reinforcing filler.

However, the present inventors have studied low heat build-up, abrasion resistance and a breaking characteristic of rubber compositions prepared by using the modified synthetic rubbers described in the patent documents 7 to 13 described above to find that while the above rubber compositions are excellent in low heat build-up, abrasion resistance and a breaking characteristic as compared with those of rubber compositions prepared by using conventional synthetic rubbers, they are not necessarily satisfactory and that they still have room to be improved.

Patent document 1: Japanese Patent Application Laid-Open Hei 6 No. 248116
Patent document 2: Japanese Patent Application Laid-Open Hei 7 No. 70369
Patent document 3: Japanese Patent Application Laid-Open Hei 8 No. 245838
Patent document 4: Japanese Patent Application Laid-Open Hei 3 No. 252431
Patent document 5: Japanese Patent Application Laid-Open Hei 6 No. 157825
Patent document 6: Japanese Patent Application Laid-Open No. 2006-37046
Patent document 7: International Publication Laid-Open No. 2003-046020 pamphlet
Patent document 8: Publication of Japanese Translation of PCT International Publication Application No. 2004-513987
Patent document 9: Japanese Patent Application Laid-Open Hei 11 No. 29603
Patent document 10: Japanese Patent Application Laid-Open No. 2003-113202
Patent document 11: Japanese Patent Publication Hei 6 No. 29338
Patent document 12: Publication of Japanese Translation of PCT International Application No. 2003-534426

Patent document 13: Japanese Patent Application Laid-Open No. 2002-201310

OUTLINE OF THE INVENTION

Problems to be Solved by the Invention

In light of the respective problems on the conventional techniques described above, the present invention is to solve them, and an object thereof is to provide a tire prepared by using for a tire member, a rubber composition which is improved in dispersion of precipitated silica and which is further improved in abrasion resistance, low heat build-up and processability to a large extent as compared with those of rubber compositions prepared by using conventional modified synthetic rubbers.

Means for Solving the Problems

Intense studies repeated by the present inventors have resulted in finding that in a tire prepared by using for a tire member, a rubber composition containing at least a rubber component and precipitated silica, a modified natural rubber having specific physical properties is used as the rubber component, and precipitated silica is provided with a specific structure, whereby obtained is a tire which is provided with low heat build-up and which is improved in abrasion resistance, a reinforcing property and processability to a large extent. Thus, the present invention has come to be completed.

That is, the tire of present invention comprises following items (1) to (11).

(1) A tire prepared by using for a tire member, a rubber composition which contains a modified natural rubber containing a polar group in the rubber molecule and precipitated silica, wherein a cetyltrimethylammonium bromide-adsorbing specific surface area (CTAB) (m$^2$/g) of the precipitated silica and the mode $A_{ac}$ (nm) in diameters of primary aggregates thereof determined by acoustic measurement of particle size distribution satisfy equation (I) shown below:

$$A_{ac} \geq -0.76 \times (CTAB) + 274 \tag{I}$$

(2) The tire as described in above item (1), wherein an ignition loss (mass reduction % when heated at 750° C. for 3 hours) and a heating loss (mass reduction % when heated at 105° C. for 2 hours) of the precipitated silica satisfy equation (II) shown below:

$$(\text{ignition loss}) - (\text{heating loss}) \leq 3 \tag{II}$$

(3) The tire as described in above item (1) or (2), wherein the precipitated silica has the mode of 1 μm or less in diameters (nm) of primary aggregates determined by acoustic measurement particle size distribution.

(4) The tire as described in any one of above items (1) to (3), wherein the precipitated silica has CTAB of 50 to 250 m$^2$/g.

(5) The tire as described in any one of above items (1) to (4), wherein the precipitated silica is compounded in an amount of 10 to 150 parts by mass based on 100 parts by mass of the rubber component.

(6) The tire as described in any one of above items (1) to (5), wherein a polar group of the modified natural rubber is at least one selected from the group consisting of an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxysilyl group and a tin-containing group.

(7) The tire as described in any one of above items (1) to (6), wherein a polar group content of the modified natural rubber is 0.001 to 0.5 mmol/g based on the rubber component of the modified natural rubber.

(8) The tire as described in any one of above items (1) to (7), further containing a modified synthetic rubber as the rubber component.

(9) The tire as described in above item (8), wherein the modified synthetic rubber is a polymer or a copolymer of a conjugated diene compound and/or an aromatic vinyl compound.

(10) The tire as described in above item (8) or (9), wherein the modified synthetic rubber is modified at a molecular chain end.

(11) The tire as described in above item (8) or (9), wherein the modified synthetic rubber is modified in a main chain.

The precipitated silica used in the present invention is obtained, as described later, by a method in which precipitated silica is deposited and precipitated by neutralizing an aqueous solution of an alkali salt of silicic acid such as sodium silicate with a mineral acid such as sulfuric acid, that is, a method according to a production method of so-called precipitated hydrated silica.

Effects of the Invention

According to the present invention, a tire which is excellent in processability and which is excellent in low fuel consumption, abrasion resistance and fracture resistance can be provided by using for a rubber member, a rubber composition containing a modified natural rubber containing a polar group in the rubber molecule as a rubber component and precipitated silica having a specific structure as a reinforcing filler.

BRIEF EXPLANATION OF DRAWING

FIG. 1 is a graph showing relation between CTAB and $A_{ac}$ of precipitated silicas used in the respective examples and comparative examples.

MODE FOR CARRYING OUT THE INVENTION

The embodiment of the present invention shall be explained below in detail.

The tire of the present invention is characterized by using for a tire member, a rubber composition which contains a modified natural rubber containing a polar group in the rubber molecule and precipitated silica, wherein a cetyltrimethylammonium bromide-adsorbing specific surface area (CTAB) (m$^2$/g) and the mode $A_{ac}$ (nm) in diameters of primary aggregates of the precipitated silica determined by acoustic measurement particle size distribution satisfy equation (I) shown below:

$$A_{ac} \geq -0.76 \times (CTAB) + 274 \tag{I}$$

A modified natural rubber (A) which is the rubber component contained in the rubber composition of the present invention is improved in rolling resistance by reducing tan δ and exerts low heat build-up, and it has higher affinity to precipitated silica which is a reinforcing filler as compared with that of a non-modified natural rubber. Further, a modified synthetic rubber (B) described later which is used together with the modified natural rubber and is contained in the rubber composition of the present invention is improved as well in rolling resistance by reducing tan δ and exerts low heat build-up, and it has higher affinity to precipitated silica which is a reinforcing filler as compared with that of a non-modified synthetic rubber. A tire prepared by using, for a tire member, the rubber composition of the present invention prepared by using the modified natural rubber (further, the modified synthetic rubber contained) and the precipitated silica described above has notably high dispersibility of the precipitated silica which is a reinforcing filler for the rubber component due to a synergistic effect of the modified natural rubber and the precipitated silica having a specific structure and allows a reinforcing effect of the precipitated silica to be further sufficiently exerted, and it is excellent in a breaking characteristic and abrasion resistance as well as processability and is enhanced in low heat build-up (a low hysteresis) to a large extent.

A natural rubber latex may be used as a raw material for production of the modified natural rubber (A) described above, and at least one solid natural rubber raw material selected from the group consisting of a natural rubber, a natural rubber latex-coagulum and a natural rubber cup lump may be used.

For example, when a natural rubber latex is used as a raw material, a polar group-containing modified natural rubber can be obtained by producing a polar group-containing modified natural rubber latex and coagulating and drying it. In this regard, a production method for the polar group-containing modified natural rubber latex shall not specifically be restricted, and it includes, for example, (A1) a method in which a polar group-containing monomer is added to a natural rubber latex to graft-polymerize the above polar group-containing monomer with a natural rubber molecule in the natural rubber latex, (A2) a method in which a polar group-containing mercapto compound is added to a natural rubber latex to add the polar group-containing mercapto compound to a natural rubber molecule in the natural rubber latex and (A3) a method in which a polar group-containing olefin and a metathesis catalyst are added to a natural rubber latex to react the polar group-containing olefin with a natural rubber molecule in the natural rubber latex by the above metathesis catalyst.

The natural rubber latex used for production of the modified natural rubber (A) described above shall not specifically be restricted, and capable of being used are, for example, a field latex, an ammonia-treated latex, a centrifugally concentrated latex, a deproteinized latex which is treated by a surfactant and an enzyme, combinations thereof and the like.

The polar group-containing monomer added to the natural rubber latex described above shall not specifically be restricted as long as it has at least one polar group in a molecule and can be graft-polymerized with a natural rubber molecule. In this regard, the polar group-containing monomer has preferably a carbon-carbon double bond in a molecule in order to graft-polymerize with a natural rubber molecule, and it is preferably a polar group-containing vinyl base monomer. Capable of being suitably listed as the specific examples of the polar group described above are an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxysilyl group, a tin-containing group and the like. The monomers containing the polar groups may be used alone or in combination of two or more kinds thereof.

The monomers containing an amino group described above include polymerizable monomers having at least one amino group selected from primary, secondary and tertiary amino groups in a molecule. Among the polymerizable monomers having an amino group, the tertiary amino group-containing monomers such as dialkylaminoalkyl(meth)acrylate are particularly preferred. The amino group-containing monomers may be used alone or in combination of two or more kinds thereof. In this respect, the primary amino group-containing monomers include acrylamide, methacrylamide, 4-vinylaniline, aminomethyl(meth)acrylate, aminoethyl(meth)acrylate, aminopropyl(meth)acrylate, aminobutyl(meth)acrylate and the like. Further, the secondary amino group-containing monomers include (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene, (2) anilinophenylbutadienes such as 1-anilinophenyl-1,3-butadiene, 1-anilinophenyl-3-methyl-1,3-butadiene, 1-anylinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and (3) N-monosubstituted-(meth)acrylamides such as N-methyl(meth)acrylamide, N-ethyl(meth)acrylamide, N-methylolacrylamide, N-(4-anilinophenyl)methacrylamide. Further, the tertiary amino group-containing monomers include N,N-disubstituted-aminoalkyl(meth)acrylates, N,N-disubstituted-aminoalkyl(meth)acrylamides and the like. The N,N-disubstituted-aminoalkyl(meth)acrylate described above includes esters of acrylic acid or methacrylic acid such as N,N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl(meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl(meth)acrylate, N,N-dibutylaminoethyl(meth)acrylate, N,N-dibutylaminopropyl(meth)acrylate, N,N-dibutylaminobutyl(meth)acrylate, N,N-dihexylaminoethyl(meth)acrylate, N,N-dioctylaminoethyl(meth)acrylate, acryloylmorphine. Among them, particularly preferred are N,N-dimethylaminoethyl(meth)acrylate, N,N-diethylaminoethyl(meth)acrylate, N,N-dipropylaminoethyl(meth)acrylate, N,N-dioctylaminoethyl(meth)acrylate, N-methyl-N-ethylaminoethyl(meth)acrylate and the like. The N,N-disubstituted-aminoalkyl(meth)acrylamide includes acrylamide compounds or methacrylamide compounds such as N,N-dimethylaminomethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl(meth)acrylamide, N,N-dibutylaminoethyl(meth)acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide, and N,N-dioctylaminopropyl(meth)acrylamide. Among them, N,N-dimethylaminopropyl(meth)acrylamide, N,N- diethylaminopropyl(meth)acrylamide, N,N-dioctylaminopropyl(meth)acrylamide and the like are particularly preferred.

The monomers containing a nitrile group described above include (meth)acrylonitrile, vinylidene cyanide and the like. The nitrile group-containing monomers may be used alone or in combination of two or more kinds thereof.

The monomers containing a hydroxyl group described above include polymerizable monomers having at least one of primary, secondary and tertiary hydroxyl groups in a molecule. The monomers include hydroxyl group-containing unsaturated carboxylic acid base monomers, hydroxyl group-containing vinyl ether base monomers, hydroxyl group-containing vinyl ketone base monomers and the like. In this respect, the specific examples of the hydroxyl group-containing monomers include hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate and 4-hydroxybutyl(meth)acrylate; mono(meth)acrylates of polyalkylene glycols (the number of an alkylene glycol unit is 2 to 23) such as polyethylene glycol and polypropylene glycol; hydroxyl group-containing unsaturated amides such as N-hydroxymethyl(meth)acrylamide, N-(2-hydroxyethyl)(meth)acrylamide, and N,N-bis(2-hydroxymethyl)(meth)acrylamide; and hydroxyl group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene and p-vinylbenzyl alcohol. Among them, the hydroxyl group-containing unsaturated carboxylic acid base monomers, the hydroxyalkyl(meth)acrylates and the hydroxyl group-containing vinyl aromatic compounds are preferred, and the hydroxyl group-containing unsaturated carboxylic acid base monomers are particularly preferred. In this respect, the hydroxyl group-containing unsaturated carboxylic acid base monomers include derivatives such as esters, amides and anhydrides of acrylic acid, methacrylic acid, itaconic acid, fumaric acid, maleic acid and the like. Among them, the esters of acrylic acid, methacrylic acid and the like are particularly preferred. The hydroxyl group-containing monomers may be used alone or in combination of two or more kinds thereof.

The monomers containing a carboxyl group described above include unsaturated carboxylic acids such as (meth)acrylic acid, maleic acid, fumaric acid, itaconic acid, tetraconic acid, and cinnamic acid; and free carboxyl group-containing esters such as monoesters of non-polymerizable polyvalent carboxylic acids such as phthalic acid, succinic acid, and adipic acid with hydroxyl group-containing unsaturated compounds such as (meth)allyl alcohol, 2-hydroxyethyl(meth)acrylate and salts thereof. Among them, the unsaturated carboxylic acids are particularly preferred. The carboxyl group-containing monomers may be used alone or in combination of two or more kinds thereof.

The monomers containing an epoxy group described above include (meth)allyl glycidyl ether, glycidyl(meth)acrylate, 3,4-oxycyclohexyl(meth)acrylate and the like. The epoxy group-containing monomers may be used alone or in combination of two or more kinds thereof.

In the monomers containing a nitrogen-containing heterocyclic group described above, the nitrogen-containing heterocycle includes pyrrole, histidine, imidazole, triazolidine, triazole, triazine, pyridine, pyrimidine, pyrazine, indole, quinoline, purine, phenazine, pteridine, melamine and the like. The nitrogen-containing heterocycles may contain other hetero atoms in the ring. In this respect, monomers containing a pyridyl group as the nitrogen-containing heterocyclic group include pyridyl group-containing vinyl compounds such as 2-vinylpyridine, 3-vinylpyridine, 4-vinylpyridine, 5-methyl-2-vinylpyridine, and 5-ethyl-2-vinylpyridine, and among them, 2-vinylpyridine, 4-vinylpyridine and the like are particularly preferred. The nitrogen-containing heterocyclic group-containing monomers may be used alone or in combination of two or more kinds thereof.

The monomers containing an alkoxysilyl group described above include (meth)acryloxymethyltrimethoxysilane, (meth)acryloxymethylmethyldimethoxysilane, (meth)acryloxymethyldimethylmethoxysilane, (meth)acryloxymethyltriethoxysilane, (meth)acryloxymethylmethyldiethoxysilane, (meth)acryloxymethyldimethylethoxysilane, (meth)acryloxymethyltripropoxysilane, (meth)acryloxymethylmethyldipropoxysilane, (meth)acryloxymethyldimethylpropoxysilane, γ-(meth)acryloxypropyltrimethoxysilane, γ-(meth)acryloxypropylmethyldimethoxysilane, γ-(meth)acryloxypropyldimethylmethoxysilane, γ-(meth)acryloxypropyltriethoxysilane, γ-(meth)acryloxypropylmethyldiethoxysilane, γ-(meth)acryloxypropyldimethylethoxysilane, γ-(meth)acryloxypropyltripropoxysilane, γ-(meth)acryloxypropylmethyldipropoxysilane, γ-(meth)acryloxypropyldimethylpropoxysilane, γ-(meth)acryloxypropylmethyldiphenoxysilane, γ-(meth)acryloxypropyldimethylphenoxysilane, γ-(meth)acryloxypropylmethyldibenzyloxysilane, γ-(meth)acryloxypropyldimethylbenzyloxysilane, trimethoxyvinylsilane, triethoxyvinylsilane, 6-trimethoxysilyl-1,2-hexene, p-trimethoxysilylstyrene and the like. The alkoxysilyl group-containing monomers may be used alone or in combination of two or more kinds thereof.

Capable of being listed as the monomers having a tin-containing group described above are tin-containing monomers such as allyltri-n-butyltin, allyltrimethyltin, allyltriphenyltin, allyltri-n-octyltin, (meth)acryloxy-n-butyltin, (meth)acryloxytrimethyltin, (meth)acryloxytriphenyltin, (meth)acryloxy-n-octyltin, vinyltri-n-butyltin, vinyltrimethyltin, vinyltriphenyltin and vinyltri-n-octyltin. The above tin-containing monomers may be used alone or in combination of two or more kinds thereof.

When the polar group-containing monomer described above is graft-polymerized with a natural rubber molecule in a natural rubber latex, the polar group-containing monomer is graft-polymerized with the natural rubber molecule by emulsion polymerization. In this connection, in the emulsion polymerization, the polar group-containing monomer is generally added to a solution prepared by adding water and, if necessary, an emulsifier to the natural rubber latex, and a polymerization initiator is further added thereto and stirred at prescribed temperature to polymerize preferably the polar group-containing monomer. In adding the polar group-containing monomer to the natural rubber latex, the emulsifier may be added in advance to the natural rubber latex, or the polar group-containing monomer may be emulsified by the emulsifier and then added to the natural rubber latex. The emulsifier which can be used for emulsifying the natural rubber latex and/or the polar group-containing monomer shall not specifically be restricted and includes nonionic surfactants such as polyoxyethylene lauryl ether.

The polymerization initiator described above shall not specifically be restricted, and various polymerization initiators for emulsion polymerization can be used. An addition method thereof shall not specifically be restricted as well. The specific examples of the polymerization initiator usually used include benzoyl peroxide, hydrogen peroxide, cumene hydroperoxide, tert-butyl hydroperoxide, di-tert-butyl peroxide, 2,2-azobisisobutyronitrile, 2,2-azobis(2-diaminopropane)hydrochloride, 2,2-azobis(2-diaminopropane)dihydrochloride, 2,2-azobis(2,4-dimethylvaleronitrile), potassium persulfate, sodium persulfate, ammonium persulfate and the like. A redox base polymerization initiator is preferably used in order to lower the polymerization temperature. A reducing agent combined with peroxides in the redox base polymerization initiator includes, for example, tetraethylenepentaamine, mercaptans, acid sodium sulfite, reducing metal ions, ascorbic acid and the like. The preferred combination of the peroxides with the reducing agent in the redox base polymerization initiators includes combination of tert-butyl hydroperoxide with tetraethylenepentaamine and the like. In order to enhance a low hysteresis and abrasion resistance of the rubber composition by using the modified natural rubber (A) described above without reducing processability thereof, it is important to introduce the polar group-containing monomer described above evenly into the respective natural rubber molecules in a small amount, and therefore an addition amount of the polymerization initiator falls in a range of preferably 1 to 100 mol %, more preferably 10 to 100 mol % based on the polar group-containing monomer.

A reaction vessel is charged with the respective components described above to react them at 30 to 80° C. for 10 minutes to 7 hours, whereby a modified natural rubber latex in which the polar group-containing monomer described above is graft-copolymerized with the natural rubber molecule is obtained. Further, the modified natural rubber latex is coagulated, and the coagulum is washed and then dried by means of a dryer such as a vacuum dryer, an air dryer and a drum dryer, whereby the modified natural rubber (A) is obtained. In this connection, a coagulant used for coagulating the modified natural rubber latex shall not specifically be restricted, and it includes acids such as formic acid and sulfuric acid and salts such as sodium chloride.

The polar group-containing mercapto compound which is added to the natural rubber latex described above and subjected to addition reaction with a natural rubber molecule in the natural rubber latex shall not specifically be restricted as long as it has at least one mercapto group and a polar group other than the mercapto group in a molecule. Capable of being suitably listed as the specific examples of the polar group described above are an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a nitrogen-containing heterocyclic group, an oxygen-containing heterocyclic group, an alkoxysilyl group, a tin-containing group and the like. The mercapto compounds containing a polar group may be used alone or in combination of two or more kinds thereof.

The mercapto compounds containing an amino group described above include mercapto compounds having at least one amino group selected from primary, secondary and tertiary amino groups in a molecule. Among the mercapto compounds having an amino group, the tertiary amino group-containing mercapto compounds are particularly preferred. In this respect, the primary amino group-containing mercapto compounds include 4-mercaptoaniline, 2-mercaptoethylamine, 2-mercaptopropylamine, 3-mercaptopropylamine, 2-mercaptobutylamine, 3-mercaptobutylamine, 4-mercaptobutylamine and the like. Also, the secondary amino group-containing mercapto compounds include N-methylaminoethanethiol, N-ethylaminoethanethiol, N-methylaminopropanethiol, N-ethylaminopropanethiol, N-methylaminobutpanethiol, N-ethylaminobutanethiol and the like. Further, the tertiary amino group-containing mercapto compounds include N,N-di-substituted-aminoalkylmercaptan such as N,N-dimethylaminoethanethiol, N,N-diethylaminoethanethiol, N,N-dimethylaminopropanethiol, N,N-diethylaminopropanethiol, N,N-dimethylaminobutanethiol, N,N-diethylaminobutanethiol and the like. Among the above amino group-containing mercapto compounds, 2-mercaptoethylamine, N,N-dimethylaminoethanethiol and the like are preferred. The amino group-containing mercapto compounds may be used alone or in combination of two or more kinds thereof.

The mercapto compounds having a nitrile group described above include 2-mercaptopropanenitrile, 3-mercaptopropanenitrile, 2-mercaptobutanenitrile, 3-mercaptobutanenitrile, 4-mercaptobutanenitrile and the like, and the above nitrile group-containing mercapto compounds may be used alone or in combination of two or more kinds thereof.

The mercapto compounds containing a hydroxyl group described above include mercapto compounds having at least one primary, secondary or tertiary hydroxyl group in a molecule.

The specific examples of the hydroxyl group-containing mercapto compounds include 2-mercaptoethanol, 3-mercapto-1-propanol, 3-mercapto-2-propanol, 4-mercapto-1-butanol, 4-mercapto-2-butanol, 3-mercapto-1-butanol, 3-mercapto-2-butanol, 3-mercapto-1-hexanol, 3-mercapto-1,2-propanediol, 2-meraptobenzyl alcohol, 2-mercaptophenol, 4-mercaptophenol and the like. Among them, 2-mercaptoethanol and the like are preferred. The above hydroxyl group-containing mercapto compounds may be used alone or in combination of two or more kinds thereof.

The mercapto compounds containing a carboxyl group described above include mercaptoacetic acid, mercaptopropionic acid, thiosalicylic acid, mercaptomalonic acid, mercaptosuccinic acid, mercaptobenzoic acid and the like. Among them, mercaptoacetic acid and the like are preferred. The above carboxyl group-containing mercapto compounds may be used alone or in combination of two or more kinds thereof.

In the mercapto compounds containing a nitrogen-containing heterocyclic group described above, the nitrogen-containing heterocycle includes pyrrole, histidine, imidazole, triazolidine, triazole, triazine, pyridine, pyrimidine, pyrazine, indole, quinoline, purine, phenazine, pteridine, melamine and the like. The above nitrogen-containing heterocycle may contain other hetero atoms in a ring. In this respect, mercapto compounds containing a pyridyl group as the nitrogen-containing heterocyclic group include 2-mercaptopyridine, 3-mercaptopyridine, 4-mercaptopyridine, 5-methyl-2-mercaptopyridine, 5-ethyl-2-mercaptopyridine and the like. Further, mercapto compounds containing other nitrogen-containing heterocyclic groups include 2-mercaptopyrimidine, 2-mercapto-5-methylbenzimidazole, 2-mercapto-1-methylimidazole, 2-mercaptobenzimidazole, 2-mercaptoimidazole and the like, and among them, 2-mercaptopyridine, 4-mercaptopyridine and the like are preferred. The nitrogen-containing heterocyclic group-containing mercapto compounds may be used alone or in combination of two or more kinds thereof.

The mercapto compounds containing an alkoxysilyl group described above include 3-mercaptopropyltrimethoxysilane, 3-mercaptopropyltriethoxysilane, 3-mercaptopropylmethyldimethoxysilane, 3-mercaptopropyldimethylmethoxysilane, 2-mercaptoethyltrimethoxysilane, 2-mercaptoethyltriethoxysilane, mercaptomethylmethyldiethoxysilane, mercaptomethyltrimethoxysilane and the like, and among them, 3-mercaptopropyltrimethoxysilane and the like are preferred. The alkoxysilyl group-containing mercapto compounds may be used alone or in combination of two or more kinds thereof.

Capable of being listed as the mercapto compounds having a tin-containing group described above are tin-containing mercapto compounds such as 2-mercaptoethyltri-n-butyltin, 2-mercaptoethyltrimethyltin, 2-mercaptoethyltriphenyltin, 3-mercaptopropyltri-n-butyltin, 3-mercaptopropyltrimethyltin, and 3-mercaptopropyltriphenyltin. The above tin-containing mercapto compounds may be used alone or in combination of two or more kinds thereof.

When the polar group-containing mercapto compound described above is added to a natural rubber molecule in the natural rubber latex, the polar group-containing mercapto compound is generally added to a solution prepared by adding water and, if necessary, an emulsifier to the natural rubber latex, and the mixture is stirred at prescribed temperature to thereby subject the polar group-containing mercapto compound to addition reaction with a double bond in a main chain of a natural rubber molecule in the natural rubber latex. In adding the polar group-containing mercapto compound to the natural rubber latex, the emulsifier may be added in advance to the natural rubber latex, or the polar group-containing mercapto compound may be emulsified by the emulsifier and then added to the natural rubber latex. Further, an organic peroxide can be added if necessary. The emulsifier which can be used for emulsifying the natural rubber latex and/or the polar group-containing mercapto compound shall not specifically be restricted and includes nonionic surfactants such as polyoxyethylene lauryl ether.

In order to enhance a low hysteresis and abrasion resistance of the rubber composition without reducing processability thereof, it is important to introduce the polar group-containing mercapto compound evenly into the respective natural rubber molecules in a small amount, and therefore the modification reaction described above is carried out preferably while stirring. For example, the respective components described above such as the natural rubber latex and the polar group-containing mercapto compound are charged into a reaction vessel and reacted at 30 to 80° C. for 10 minutes to 24 hours, whereby a modified natural rubber latex in which the polar group-containing mercapto compound is added to a natural rubber molecule is obtained.

The polar group-containing olefin added to the natural rubber latex described above has at least one polar group in a molecule, and it has a carbon-carbon double bond in order to carry out cross metathesis reaction with a natural rubber molecule. In this regard, capable of being suitably listed as the specific examples of the polar group are an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxysilyl group, a tin-containing group and the like. The polar group-containing olefins may be used alone or in combination of two or more kinds thereof.

The olefins containing an amino group described above include olefins having at least one amino group selected from primary, secondary and tertiary amino groups in a molecule. Among the olefins having an amino group, the tertiary amino group-containing olefins such as dialkylaminoalkyl(meth)acrylates are particularly preferred. The amino group-containing olefins may be used alone or in combination of two or more kinds thereof. In this respect, the primary amino group-containing olefins include acrylamide, methacrylamide, 4-vinylaniline, aminomethyl(meth)acrylate, aminoethyl(meth)acrylate, aminopropyl(meth)acrylate, aminobutyl(meth)acrylate and the like. Further, the secondary amino group-containing olefins include (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene and α-carboxy-β-carboxy-β-phenyl-p-anilinostyrene, (2) anilinophenylbutadienes such as 1-anilinophenyl-1,3-butadiene, 1-anilinophenyl-3-methyl-1,3-butadiene, 1-anylinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and (3) N-monosubstituted-(meth)acrylamides such as N-methyl(meth)acrylamide, N-ethyl(meth)acrylamide, N-methylolacrylamide and N-(4-anilinophenyl)methacrylamide. Further, the tertiary amino group-containing olefins include N,N-disubstituted-aminoalkyl(meth)acrylates, N,N-disubstituted-aminoalkyl(meth)acrylamides and the like. The N,N-disubstituted-aminoalkyl(meth)acrylate includes esters of acrylic acid or methacrylic acid such as N-N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl(meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl(meth)acrylate, N,N-dibutylaminoethyl(meth)acrylate, N,N-dibutylaminopropyl(meth)acrylate, N,N-dibutylaminobutyl(meth)acrylate, N,N-dihexylaminoethyl(meth)acrylate, N,N-dioctylaminoethyl(meth)acrylate, acryloylmorpholine and the like. Among them, particularly preferred are N,N-dimethylaminoethyl(meth)acrylate, N,N-diethylaminoethyl(meth)acrylate, N,N-dipropylaminoethyl(meth)acrylate, N,N-dioctylaminoethyl(meth)acrylate, N-methyl-N-ethylaminoethyl(meth)acrylate and the like. Also, the N,N-disubstituted-aminoalkyl(meth)acrylamide includes acrylamide compounds or methacrylamide compounds such as N,N-dimethylaminomethyl(meth)acrylamide, N,N-dimethylaminoethyl(meth)acrylamide, N,N-dimethylaminopropyl(meth)acrylamide, N,N-dimethylaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl(meth)acrylamide, N,N-dibutylaminoethyl(meth)acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide, and N,N-dioctylaminopropyl(meth)acrylamide. Among them, N,N-dimethylaminopropyl(meth)acrylamide, N,N-diethylaminopropyl(meth)acrylamide, N,N-dioctylaminopropyl(meth)acrylamide and the like are particularly preferred.

The olefins containing a nitrile group described above include (meth)acrylonitrile, vinylidene cyanide and the like. The nitrile group containing-olefins may be used alone or in combination of two or more kinds thereof.

The olefins containing a hydroxyl group described above include metathesis-reactive olefins having at least one of primary, secondary and tertiary hydroxyl groups in a molecule.

The olefins include hydroxyl group-containing unsaturated carboxylic acid base olefins, hydroxyl group-containing vinyl ether base olefins, hydroxyl group-containing vinyl ketone base olefins and the like. In this respect, the specific examples of the hydroxyl group-containing olefins include hydroxyalkyl(meth)acrylates such as 2-hydroxyethyl(meth) acrylate, 2-hydroxypropyl(meth)acrylate, 3-hydroxypropyl (meth)acrylate, 2-hydroxybutyl(meth)acrylate, 3-hydroxybutyl(meth)acrylate and 4-hydroxybutyl(meth)acrylate; mono(meth)acrylates of polyalkylene glycols (the number of an alkylene glycol unit is 2 to 23) such as polyethylene glycol and polypropylene glycol; hydroxyl group-containing unsaturated amides such as N-hydroxymethyl(meth)acrylamide, N-(2-hydroxyethyl)(meth)acrylamide, N,N-bis(2-hydroxymethyl)(meth)acrylamide and the like; and hydroxyl group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene and p-vinylbenzyl alcohol. Among them, the hydroxyl group-containing unsaturated carboxylic acid base olefins, the hydroxyalkyl(meth)acrylates and the hydroxyl group-containing vinyl aromatic olefins are preferred, and the hydroxyl group-containing unsaturated carboxylic acid base olefins are particularly preferred. In this respect, the hydroxyl group-containing unsaturated carboxylic acid base olefins include derivatives such as esters, amides and anhydrides of acrylic acid, methacrylic acid, itaconic acid, fumaric acid, maleic acid and the like, and among them, the esters of acrylic acid, methacrylic acid and the like are particularly preferred. The hydroxyl group-containing olefins may be used alone or in combination of two or more kinds thereof.

The olefins containing a carboxyl group described above include unsaturated carboxylic acids such as (meth)acrylic acid, maleic acid, fumaric acid, itaconic acid, tetraconic acid and cinnamic acid; and free carboxyl group-containing esters such as monoesters of non-polymerizable polyvalent carboxylic acids such as phthalic acid, succinic acid and adipic acid with hydroxyl group-containing unsaturated compounds such as (meth)allyl alcohol, 2-hydroxyethyl(meth)acrylate and salts thereof. Among them, the unsaturated carboxylic acids are particularly preferred. The above carboxyl group-containing olefins may be used alone or in combination of two or more kinds thereof.

The olefins containing an epoxy group described above include (meth)allyl glycidyl ether, glycidyl(meth)acrylate, 3,4-oxycyclohexyl(meth)acrylate and the like. The above epoxy group-containing olefins may be used alone or in combination of two or more kinds thereof.

In the olefins having a nitrogen-containing heterocyclic group described above, the nitrogen-containing heterocycle includes pyrrole, histidine, imidazole, triazolidine, triazole, triazine, pyridine, pyrimidine, pyrazine, indole, quinoline, purine, phenazine, pteridine, melamine and the like. The nitrogen-containing heterocycle may contain other hetero atoms in a ring. In this respect, olefins containing a pyridyl group as the nitrogen-containing heterocyclic group include pyridyl group-containing vinyl compounds such as 2-vinylpyridine, 3-vinylpyridine, 4-vinylpyridine, 5-methyl-2-vinylpyridine, 5-ethyl-2-vinylpyridine and the like, and among them, 2-vinylpyridine, 4-vinylpyridine and the like are particularly preferred. The above nitrogen-containing heterocyclic group-containing olefins may be used alone or in combination of two or more kinds thereof.

The olefins containing an alkoxysilyl group described above include (meth)acryloxymethyltrimethoxysilane, (meth)acryloxymethylmethyldimethoxysilane, (meth)acryloxymethyldimethylmethoxysilane, (meth)acryloxymethyltriethoxysilane, (meth)acryloxymethylmethyldiethoxysilane, (meth)acryloxymethyldimethylethoxysilane, (meth)acryloxymethyltripropoxysilane, (meth)acryloxymethylmethyldipropoxysilane, (meth)acryloxymethyldimethylpropoxysilane, γ-(meth)acryloxypropyltrimethoxysilane, γ-(meth)acryloxypropylmethyldimethoxysilane, γ-(meth)acryloxypropyldimethylmethoxysilane, γ-(meth)acryloxypropyltriethoxysilane, γ-(meth)acryloxypropylmethyldiethoxysilane, γ-(meth)acryloxypropyldimethylethoxysilane, γ-(meth)acryloxypropyltripropoxysilane, γ-(meth)acryloxypropylmethyldipropoxysilane, γ-(meth)acryloxypropyldimethylpropoxysilane, γ-(meth)acryloxypropylmethyldiphenoxysilane, γ-(meth)acryloxypropyldimethylphenoxysilane, γ-(meth)acryloxypropylmethyldibenzyloxysilane, γ-(meth)acryloxypropyldimethylbenzyloxysilane, trimethoxyvinylsilane, triethoxyvinylsilane, 6-trimethoxysilyl-1,2-hexene, p-trimethoxysilylstyrene and the like. The above alkoxysilyl group-containing olefins may be used alone or in combination of two or more kinds thereof.

Capable of being listed as the olefins having a tin-containing group described above are tin-containing monomers such as allyltri-n-butyltin, allyltrimethyltin, allyltriphenyltin, allyltri-n-octyltin, (meth)acryloxy-n-butyltin, (meth)acryloxytrimethyltin, (meth)acryloxytriphenyltin, (meth)acryloxy-n-octyl tin, vinyltri-n-butyltin, vinyltrimethyltin, vinyltriphenyltin and vinyltri-n-octyltin. The above tin-containing olefins may be used alone or in combination of two or more kinds thereof.

When the polar group-containing olefin is reacted with a natural rubber molecule in the natural rubber latex by a metathesis catalyst, the polar group-containing olefin is generally added to a solution prepared by adding water and, if necessary, an emulsifier to the natural rubber latex, and the metathesis catalyst is further added thereto and stirred at prescribed temperature to subject the natural rubber molecule and the polar group-containing olefin to metathesis reaction. In this respect, in adding the polar group-containing olefin to the natural rubber latex, the emulsifier may be added in advance to the natural rubber latex, or the polar group-containing olefin may be emulsified by the emulsifier and then added to the natural rubber latex. The emulsifier which can be used for emulsifying the natural rubber latex and/or the polar group-containing olefin shall not specifically be restricted and includes nonionic surfactants such as polyoxyethylene lauryl ether.

The metathesis catalyst described above shall not specifically be restricted as long as it has catalytic action to metathesis reaction of the natural rubber molecule with the polar group-containing olefin, and various metathesis catalysts can be used. The metathesis catalyst contains a transition metal, and since it is used in a natural rubber latex, it has preferably high stability to water. Accordingly, the transition metal constituting the metathesis catalyst is preferably any of ruthenium, osmium and iridium. Capable of being listed as the metathesis catalyst are, to be specific, bis(tricyclohexylphosphine)-benzylideneruthenium dichloride [$RuCl_2$(=CHPh)($PCy_3$)$_2$] and in addition thereto, $RuCl_2$(=CH—CH=$CPh_2$) ($PPh_3$)$_2$, $RuCl_2$(=CHPh) ($PCp_3$)$_2$, $RuCl_2$(=CHPh) ($PPh_3$)$_2$, $RuCl_2$(=CHPh) [$Cy_2PCH_2CH_2N(CH_3)_3{}^-Cl$]$_2$ and the like. In the chemical formulas, Cy represents a cyclohexyl group, and Cp represents a cyclopentyl group. An addition amount of the metathesis catalyst described above falls in a range of preferably 1 to 500 mol %, more preferably 10 to 100 mol % based on the polar group-containing olefin described above.

The respective components described above are charged into a reaction vessel and reacted at 30 to 80° C. for 10 minutes to 24 hours, whereby a modified natural rubber latex in which the polar group is introduced into a natural rubber molecule is obtained.

When at least one natural rubber raw material selected from the group consisting of a natural rubber, a natural rubber latex coagulum and a natural rubber cup lump is used as a raw material, a mechanical shearing force is applied to the polar group-containing compound, and it is graft-polymerized with or added to the natural rubber raw material, whereby the modified natural rubber is obtained.

Various solid natural rubbers after dried, various natural rubber latex coagulum (including unsmoked sheets) or various natural rubber cup lumps can be used as the natural rubber raw material described above, and the natural rubber raw materials may be used alone or in combination of two or more kinds thereof.

When the polar group-containing compound described above is graft-polymerized with a natural rubber molecule in the natural rubber raw material, the polar group-containing compound has preferably a carbon-carbon double bond in a molecule, and it is preferably a polar group-containing vinyl base monomer. On the other hand, when the polar group-containing compound is subjected to addition reaction with a natural rubber molecule in the natural rubber raw material, the polar group-containing compound has preferably a mercapto group in a molecule, and it is preferably a polar group-containing mercapto compound.

A means for applying mechanical shearing force to a mixture of the natural rubber raw material and the polar group-containing compound each described above is preferably a twin screw kneading extender and a dry pre-breaker. In this connection, when the polar group-containing compound is graft-polymerized with a natural rubber molecule in the natural rubber raw material, a polymerization initiator is added to the foregoing equipment for applying mechanical shearing force together with the natural rubber raw material and the polar group-containing compound (preferably the polar group-containing vinyl base monomer) to apply mechanical shearing force thereto, whereby the polar group-containing compound can be introduced into a natural rubber molecule in the natural rubber raw material by graft polymerization. Also, when the polar group-containing compound is added to a natural rubber molecule in the natural rubber raw material, the natural rubber raw material and the polar group-containing compound (preferably the polar group-containing mercapto compound) are added to the foregoing equipment for applying mechanical shearing force, and organic peroxide and the like are further added, if necessary, to apply mechanical shearing force thereto, whereby the polar group-containing compound can be subjected to addition reaction with a double bond in a main chain of a natural rubber molecule in the natural rubber raw material. The polar group-containing compound used includes the polar group-containing monomers, the polar group-containing mercapto compounds and the polar group-containing olefins each described above.

The respective components described above are charged into the equipment for applying mechanical shearing force to apply mechanical shearing force thereto, whereby obtained is the modified natural rubber (A) in which the polar group-containing compound described above is graft-polymerized with or added to a natural rubber molecule. In the above case, a modification reaction of the natural rubber molecule may be carried out while heating, and it is carried out at a temperature of preferably 30 to 160° C., more preferably 50 to 130° C., whereby the modified natural rubber can be obtained at a sufficiently high reaction efficiency.

A polar group content of the modified natural rubber described above falls in a range of preferably 0.001 to 0.5 mmol/g, more preferably 0.01 to 0.5 mmol/g and furthermore preferably 0.01 to 0.1 mmol/g based on the rubber component in the modified natural rubber. If a polar group content of the modified natural rubber (A) is less than 0.001 mmol/g, the rubber composition can not sufficiently be improved in a low hysteresis and abrasion resistance in a certain case. On the other hand, if a polar group content of the modified natural rubber (A) exceeds 0.5 mmol/g, the intrinsic physical characteristics of the natural rubber such as viscoelasticity and an S—S characteristic (a stress-deformation curve in a tensile test) are likely to be changed to a large extent, and the intrinsic excellent physical characteristics of the natural rubber are likely to be damaged. In addition thereto, processability of the rubber composition is likely to be deteriorated.

Further, in the present invention, a modified synthetic rubber (B) can be added as the rubber component together with the modified natural rubber described above.

The modified synthetic rubber (B) which can be used shall not specifically be restricted, and publicly known synthetic rubbers can be used. For example, a conjugate diene compound and/or an aromatic vinyl compound can be used as a monomer for the modified synthetic rubber, and polymers obtained by modifying a molecular chain end and/or the main chain of a polymer or a copolymer of the conjugate diene compound and/or aromatic vinyl compound can be used as the modified synthetic rubber. To be specific, capable of being shown as the examples of publicly known modified synthetic rubbers in which molecular chain ends are modified are modified synthetic rubbers disclosed in International Publication No. 2003-046020, Publication of Japanese Translation of PCT International Publication No. 2004-513987, Japanese Patent Application Laid-Open Hei 11 No. 29603, Japanese Patent Application Laid-Open No. 2003-113202 and Japanese Patent Publication Hei 6 No. 29338. Modified synthetic rubbers disclosed in Publication of Japanese Translation of PCT International Application No. 2003-534426 and Japanese Patent Application Laid-Open No. 2002-201310 can be shown as the examples of publicly known modified synthetic rubbers in which main chains are modified.

In respect to monomers used for synthesizing the modified synthetic rubbers described above, the conjugate diene compounds include 1,3-butadiene, isoprene, 1,3-pentadiene, 2,3-dimethylbutadiene, 2-phenyl-1,3-butadiene, 1,3-hexadiene and the like, and the aromatic vinyl compounds include styrene, α-methylstyrene, 1-vinylnaphthalene, 3-vinyltoluene, ethylvinylbenzene, divinylbenzene, 4-cyclohexylstyrene, 2,4,6-trimethylstyrene and the like.

The synthetic rubbers in which molecular chain ends are modified can be produced, for example, by (B1-1) a method in which the monomers described above are subjected to living polymerization and in which active ends thereof are then modified by a modifying agent and (B1-2) a method in which the monomers described above are subjected to living polymerization by using a polymerization initiator having a functional group. The living polymerization may be carried out either by anionic polymerization or coordination polymerization, and allowed to be employed is a method in which (B1-1) and (B1-2) are combined, that is, a method in which the monomers described above are subjected to living polymerization by using a polymerization initiator having a functional group and in which active ends thereof are then modified by a modifying agent.

Further, the synthetic rubbers in which main chains are modified can be produced, for example, by (B2-1) a method in which a polar group-containing monomer is graft-polymerized with a (co)polymer of the monomers described above, (B2-2) a method in which the polar group-containing monomer is copolymerized with the monomers described above and (B2-3) a method in which the polar group-containing monomer is added to a (co)polymer of the monomers described above. The copolymerization using the polar group-containing monomer may be carried out by emulsion polymerization, living anionic polymerization or living radical polymerization, and the copolymer of the monomer described above with the polar group-containing monomer may be a copolymer obtained by block-polymerizing a monomer selected from the conjugate diene compounds and the aromatic vinyl compounds with the polar group-containing monomer. Further, the polar group-containing monomers and the like shown as the examples in the item of the modified natural rubber described above can be used as the polar group-containing monomers in the method (B2-1) in which the (co)polymer of the conjugate diene compound and the aromatic vinyl compound is graft-polymerized with the polar group-containing monomer and the method (B2-2) in which the conjugate diene compound and the aromatic vinyl compound are copolymerized with the polar group-containing monomer. Also, the group-containing mercapto compounds and the like shown as the examples in the item of the modified natural rubber (A) can be used as the group-containing compounds in the method (B2-3) in which the polar group-containing monomer is added to the (co)polymer of the conjugate diene compound and the aromatic vinyl compound.

When the (co)polymer having an active end is produced by anionic polymerization, a polymerization initiator is preferably lithium compounds, more preferably hydrocarbyllithium and lithiumamide compounds. A use amount of the polymerization initiator in the anionic polymerization falls in a range of preferably 0.2 to 20 mmol based on 100 g of the monomer. The hydrocarbyllithium described above includes ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, reaction products of diisopropenylbenzene with butyllithium and the like. Also, the lithiumamide compounds described above include lithiumhexamethyleneimide, lithiumpyrrolidide, lithiumpiperidide, lithiumheptamethyleneimide, lithiumdodecamethyleneimide, lithiumdimethylamide, lithiumdiethylamide, lithiumdipropylamide, lithiumdibutylamide, lithiumdihexylamide, lithiumdiheptylamide, lithiumdioctylamide, lithiumdi-2-ethylhexylamide, lithiumdidecylamide, lithium-N-methylpiperadide, lithiumethylpropylamide, lithiumethylbutylamide, lithiummethylbutylamide, lithiumethylbenzylamide, lithiummethylphenethylamide and the like.

Lithiumamide compounds represented by a formula Li-AM [wherein AM represents a substituted amino group represented by the following Formula (III):

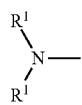

(III)

(wherein $R^2$ each are independently an alkyl group having 1 to 12 carbon atoms, a cycloalkyl group or an aralkyl group) or a cyclic amino group represented by the following Formula (IV):

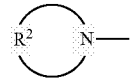

(IV)

(wherein $R^2$ represents an alkylene group having 3 to 16 methylene groups, a substituted alkylene group, an oxyalkylene group or a N-alkylamino-alkylene group) are used as the lithiumamide compounds described above, whereby obtained is a modified synthetic rubber in which at least one nitrogen-containing functional group selected from the group consisting of the substituted amino groups represented by Formula (III) and the cyclic amino groups represented by Formula (IV) is introduced.

In Formula (III) described above, $R^2$ is an alkyl group having 1 to 12 carbon atoms, a cycloalkyl group or an aralkyl group, and it includes suitably, to be specific, methyl, ethyl, butyl, octyl, cyclohexyl, 3-phenyl-1-propyl, isobutyl and the like. $R^2$ may be same as or different from each other. Further, in Formula (IV) described above, $R^2$ is an alkylene group having 3 to 16 methylene groups, a substituted alkylene group, an oxyalkylene group or a N-alkylamino-alkylene group. In this connection, the substituted alkylene group includes monosubstituted to octasubstituted alkylene groups, and the substituent includes a linear or branched alkyl group having 1 to 12 carbon atoms, a cycloalkyl group, a bicycloalkyl group, an aryl group and an aralkyl group. Also, $R^2$ is preferably, to be specific, trimethylene, tetramethylene, hexamethylene, oxydiethylene, N-alkylazadiethylene, dodecamethylene, hexadecamethylene and the like.

The lithiumamide compounds described above may be preliminarily prepared from a secondary amine and a lithium compound and then used for the polymerization reaction, or it may be formed in the polymerization system. In this connection, the secondary amine includes dimethylamine, diethylamine, dibutylamine, dioctylamine, dicyclohexylamine, diisobutylamine and the like and in addition thereto, cyclic amines such as azacycloheptane (that is, hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadece-9-ene, 3-isobutyl-1-azacyclododecane, 2-methyl-7-t-butyl-1-azacyclododecane, 5-nonyl-1-azacyclododecane, 8-(4'-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane and 1,5,5-trimethyl-3-azabicyclo[4.4.0]decane. Also, the hydrocarbyllithiums described above can be used as the lithium compound.

On the other hand, when the (co)polymer having an active end is produced by coordination polymerization, a rare earth metal compound is preferably used as a polymerization initiator, and a (a) component, a (b) component and a (c) component each shown below are more preferably used in combination.

The component (a) used for the coordination polymerization described above is selected from rare earth metal compounds and complex compounds of a rare earth metal compound and a Lewis base. In this respect, the rare earth metal compounds include carboxylates, alkoxides, β-diketone complexes, phosphates and phosphites of rare earth elements, and the Lewis bases include acetylacetone, tetrahydrofuran, pyridine, N,N-dimethylformamide, thiophene, diphenyl ether, triethylamine, organic phosphorus compounds, monohydric or dihydric alcohols and the like. The rare earth elements of the rare earth metal compounds described above are preferably lanthanum, neodymium, praseodymium, samarium and gadolinium, and among them, neodymium is particularly preferred. Further, the component (a) includes, to be specific, neodymium tri-2-ethylhexanoate and complex compounds thereof with acetylacetone, neodymium trineodecanoate and complex compounds thereof with acetylacetone, neodymium tri-n-butoxide and the like. The components (a) may be used alone or in a mixture of two or more kinds thereof.

The component (b) used for the coordination polymerization described above is selected from organic aluminum compounds. The organic aluminum compounds include, to be specific, trihydrocarbylaluminum compounds represented by a formula $R^3_3Al$, hydrocarbylaluminum hydrides represented by a formula $R^3_2AlH$ or $R^3AlH_2$ (in the formulas, $R^3$ each are independently a hydrocarbon group having 1 to 30 carbon atoms), hydrocarbylaluminoxane compounds having a hydrocarbon group having 1 to 30 carbon atoms and the like. The organic aluminum compounds include, to be specific, trialkylaluminum, dialkylaluminum hydride, alkylaluminum dihydride, alkylaluminoxane and the like. The compounds may be used alone or in a mixture of two or more kinds thereof. Aluminoxane and the other organic aluminum compounds are preferably used in combination as the component (b).

The component (c) used for the coordination polymerization described above is selected from hydrolyzable compounds having a halogen or complex compounds thereof with a Lewis base; organic halogen compounds having tertiary alkyl halide, benzyl halide or allyl halide; and ionic compounds comprising a non-coordinate anion and a counter cation. The above component (c) includes, to be specific, complexes of alkylaluminum dichloride, dialkylaluminum chloride, silicon tetrachloride, tin tetrachloride and zinc chloride with a Lewis base such as alcohols, complexes of magnesium chloride with a Lewis base such as alcohols, benzyl chloride, t-butyl chloride, benzyl bromide, t-butyl bromide, and triphenylcarboniumtetrakis(pentafluorophenyl) borate. The above components (c) may be used alone or in a mixture of two or more kinds thereof.

The polymerization initiator described above may be preliminarily prepared by using, if necessary, the same conjugate diene compound as the monomer for polymerization and/or a non-conjugate diene compound in addition to the components (a), (b) and (c). Further, all or a part of the component (a) or the component (c) may be used by carrying them on an inert solid. A use amount of the respective components described above can suitably be set, and that of the component (a) is usually 0.001 to 0.5 mmol based on 100 g of the monomer. Further, the component (b)/the component (a) falls in a range of preferably 5 to 1000 in terms of a mole ratio, and the component (c)/the component (a) falls in a range of preferably 0.5 to 10.

In modifying the active end of the (co)polymer having an active end by a modifying agent, a nitrogen-containing compound, a silicon-containing compound, a tin-containing compound and the like can be used as the modifying agent.

The nitrogen-containing compound which can be used as the modifying agent described above includes N,N'-dimethylimidazolidinone (1,3-dimethyl-2-imidazolidinone), N-methylpyrrolidone, 4-dimethylaminobenzylideneaniline, 4,4'-bis(N,N-dimethylamino)benzophenone, 4,4'-bis(N,N-diethylamino)benzophenone, 4-(N,N-dimethylamino)benzophenone, 4-(N,N-diethylamino)benzophenone, [4-(N,N-dimethylamino)phenyl]methyl ethyl ketone, 4,4'-bis(1-hexamethyleneiminomethyl)benzophenone, 4,4'-bis(1-pyrrolidinomethyl)benzophenone, 4-(1-hexamethyleneiminomethyl)benzophenone, 4-(1-pyrrolidinomethyl)benzophenone, [4-(1-hexamethyleneimino)phenyl]methyl ethyl ketone and the like.

Further, the nitrogen-containing compound used as the modifying agent may have a chlorosulfenyl group or a chlorosulfonyl group, and capable of being used as the modifying agent having a chlorosulfenyl group or a chlorosulfonyl group in addition to nitrogen are 2,4-dinitrobenzenesulfenyl chloride, 4-nitrobenzenesulfenyl chloride, 4-nitrobenzenesulfonyl chloride, 2-acetamidobenzenesulfonyl chloride, 1-aminonaphthyl-5-sulfonyl chloride, quinolinesulfonyl chloride, dimethylsulfamoyl chloride, dimethylsulfonyl chloride, 2,4-dinitrobenzenesulfonyl chloride and the like which are disclosed in Japanese Patent Application Laid-Open Hei 11 No. 29603.

In prior to modification by the nitrogen-containing compound described above, the (co)polymer having an active end may be reacted with a 1,1-diphenylethylene compound having a polar group disclosed in Japanese Patent Application Laid-Open No. 2003-113202, and to be specific, 1-(4-N,N-dimethylaminophenyl)-1-phenylethylene and the like can be used as the 1,1-diphenylethylene compound.

Further, the silicon-containing compound which can be used as the modifying agent is preferably a hydrocarbyloxysilane compound, and it is more preferably a hydrocarbyloxysilane compound represented by the following Formula (V):

(wherein A is a monovalent group having at least one functional group selected from (thio)epoxy, (thio)isocyanate, (thio)ketone, (thio)aldehyde, imine, amide, isocyanuric acid triester, hydrocarbyl(thio)carboxylate, metal salts of (thio)carboxylic acid, carboxylic anhydride, carboxylic halide and dihydrocarbyl carbonate; $R^3$ and $R^4$ each are independently a monovalent aliphatic hydrocarbon group having 1 to 20 carbon atoms or a monovalent aromatic hydrocarbon group having 6 to 18 carbon atoms; $R^5$ is a single bond or a divalent inactive hydrocarbon group having 1 to 20 carbon atoms; n is an integer of 1 to 3; when plural $OR^3$ are present, the plural $OR_3$ may be same as or different from each other; and an active proton and an onium salt are not contained in a molecule) or the following Formula (VI):

(wherein $R^6$ and $R^7$ each are independently a monovalent aliphatic hydrocarbon group having 1 to 20 carbon atoms or a monovalent aromatic hydrocarbon group having 6 to 18 carbon atoms; p is an integer of 0 to 2; when plural $OR^7$ are present, the plural $OR^7$ may be same as or different from each other; and an active proton and an onium salt are not contained in a molecule).

In respect to Formula (V) described above, among the functional groups in A, the imine includes ketimine, aldimine and amidine, and the (thio)carboxylic acid ester includes unsaturated carboxylic acid esters such as acrylates and methacrylates. Further, alkali metals, alkaline earth metals, Al, Sn, Zn and the like can be listed as metals of the metal salts of (thio)carboxylic acid. Also, n is an integer of 1 to 3, preferably 3, and when n is 2 or 3, respective $R^3O$ may be same or different.

$R^3$ and $R^4$ include an alkyl group having 1 to 20 carbon atoms, an alkenyl group having 2 to 18 carbon atoms, an aryl group having 6 to 18 carbon atoms, an aralkyl group having 7 to 18 carbon atoms and the like. In this connection, the alkyl group and the alkenyl group may be any of linear, branched and cyclic groups and include, for example, methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, cyclohexenyl and the like. Also, the aryl group may have a substituent such as a lower alkyl group on an aromatic ring and includes, for example, phenyl, tolyl, xylyl, naphthyl and the like. Further, the aralkyl group may have a substituent such as a lower alkyl group on an aromatic ring and includes, for example, benzyl, phenethyl, naphthylmethyl and the like.

Among $R^5$, the divalent inactive hydrocarbon group having 1 to 20 carbon atoms is preferably an alkylene group having 1 to 20 carbon atoms. The alkylene group may be any of linear, branched and cyclic groups and is particularly suitably a linear group. The linear alkylene group includes methylene, ethylene, trimethylene, tetramethylene, pentamethylene, hexamethylene, octamethylene, decamethylene, dodecamethylene and the like.

The hydrocarbyloxysilane compound represented by Formula (V) is preferably, for example, 3-glycidoxypropyltrimethoxysilane, 3-glycidoxypropyltriethoxysilane, N-(1-methylpropylidene)-3-(triethoxysilyl)-1-propaneamine, N-(1, 3-dimethylbutylidene)-3-(triethoxysilyl)-1-propaneamine, N-(3-triethoxysilylpropyl)-4,5-dihydroimidazol, 3-methacryloyloxypropyltrimethoxysilane, 3-isocyanatopropyltriethoxysilane and 3-triethoxysilylpropylsuccinic anhydride.

On the other hand, $R^6$ and $R^7$ in Formula (VI) are the same as those explained for $R^3$ and $R^4$ in Formula (V). The hydrocarbyloxysilane compound represented by Formula (VI) includes, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, dimethyldimethoxysilane, methylphenyldimethoxysilane, vinyltrimethoxysilane, vinyltriethoxysilane, divinyldimethoxysilane, divinyldiethoxysilane and the like, and among them, tetraethoxysilane is preferred.

After modifying (primary modification) the (co)polymer by the hydrocarbyloxysilane compound described above, the modified (co)polymer may be further reacted with a partial ester of polyhydric alcohol with a carboxylic acid, or a condensation accelerator may be added to modify (secondary modification) it by the hydrocarbyloxysilane compound which remains or is newly added. In this connection, capable of being used as the partial ester of polyhydric alcohol with a carboxylic acid are sorbitan monolaurate, sorbitan monopalmitate, sorbitan monostearate, sorbitan tristearate, sorbitan monooleate, sorbitan trioleate and the like, and capable of being used as the condensation accelerator are carboxylic acid tin salts in which tin has an oxidation number 2, tin compounds having an oxidation number 4, titanium compounds having an oxidation number 4 and the like which are disclosed in International Publication No. 2003-046020.

Further, the modifying agent described above is preferably a coupling agent represented by the following Formula (VII):

$$R^8_a Z X_b \qquad (VII)$$

(wherein $R^8$ each are independently selected from the group consisting of an alkyl group having 1 to 20 carbon atoms, a cycloalkyl group having 3 to 20 carbon atoms, an aryl group having 6 to 20 carbon atoms and an aralkyl group having 7 to 20 carbon atoms; Z is tin or silicon; X each are independently chlorine or bromine; a is 0 to 3, and b is 1 to 4, provided that a+b is 4). The conjugate diene base polymer modified by the coupling agent represented by Formula (VII) has at least one tin-carbon bond or silicon-carbon bond. In this respect, $R^8$ includes, to be specific, methyl, ethyl, n-butyl, neophyl, cyclohexyl, n-octyl, 2-ethylhexyl and the like. The coupling agent represented by Formula (VII) is preferably tin tetrachloride, $R^8 SnCl_3$, $R^8_2 SnCl_2$, $R^8_3 SnCl$ and the like, and tin tetrachloride is particularly preferred.

The modification reaction by the modifying agent described above is carried out preferably by solution reaction, and the monomer used in the polymerization may be contained in the solution. Also, a reaction mode of the modification reaction shall not specifically be restricted and may be either a batch system or a continuous system. Further, a reaction temperature of the modification reaction shall not specifically be restricted as long as the reaction proceeds, and the reaction temperature used in the polymerization reaction may be employed as it is. A use amount the modifying agent falls in a range of preferably 0.25 to 3.0 mol, more preferably 0.5 to 1.5 mol based on 1 mol of the polymerization initiator used for producing the (co)polymer.

In the rubber composition used in the present invention, when the modified synthetic rubber described above is used in combination as the rubber component, a mass ratio (A/B) of the modified natural rubber described above to the modified synthetic rubber falls in a range of preferably 90/10 to 10/90. If a proportion of the modified natural rubber (A) based on the total of the modified natural rubber (A) and the modified synthetic rubber (B) is less than 10% by mass, an effect of using the modified natural rubber (A) is likely not to be sufficiently exerted. On the other hand, if a proportion of the modified synthetic rubber (B) based on the total of the modified natural rubber (A) and the modified synthetic rubber (B) is less than 10% by mass, an effect of using the modified synthetic rubber (B) is likely not to be sufficiently exerted.

Structural precipitated silica used in the present invention can be confirmed by that characteristic values thereof measured by a method usually used for measuring silica, carbon black and the like satisfy the following relations.

That is, it is precipitated silica in which a cetyltrimethylammonium bromide-adsorbing specific surface area (CTAB) (m²/g) and a diameter $A_{ac}$ (nm) of the mode in the number of primary aggregates determined by an acoustic measurement of particle size distribution satisfy equation (I) shown below:

$$A_{ac} \geq -0.76 \times (CTAB) + 274 \qquad (I)$$

and in which an ignition loss (mass reduction % when heated at 750° C. for 3 hours) and a heating loss (mass reduction % when heated at 105° C. for 2 hours) satisfy equation (II) shown below:

$$\text{(ignition loss)} - \text{(heating loss)} \leq 3 \tag{II}$$

The cetyltrimethylammonium bromide-adsorbing specific surface area (CTAB) is a specific surface area (m²/g) of precipitated silica calculated from an adsorbing amount of cetyltrimethylammonium bromide onto a surface of precipitated silica.

CTAB can be measured according to a method described in ASTM D3765-92. The method described in ASTM D3765-92 is a method for measuring CTAB of carbon black, and therefore it shall be slightly modified. That is, a standard product of carbon black is not used, and a cetyltrimethylammonium bromide (hereinafter abbreviated as CE-TRAB) standard solution is prepared. This is used to standardize a precipitated silica OT (sodium di-2-ethylhexylsulfosuccinate) solution to calculate a specific surface area from an adsorbing amount of CE-TRAB assuming that an adsorbing cross-sectional area per one molecule of CE-TRAB onto a surface of precipitated silica is set to 0.35 nm².

Precipitated silica used in the present invention has CTAB of 50 to 250 m²/g, preferably 100 to 200 m²/g. If CTAB is less than 50 m²/g, the rubber composition is likely to be notably reduced in a storage elastic modulus, and if it is larger than 250 m²/g, the unvulcanized rubber composition is likely to be risen in a viscosity.

A diameter measured as a particle diameter of precipitated silica by means of an acoustic measuring equipment of particle size distribution (particle size distribution diameter by acoustic measurement) is an index for development of a structural property. The particles of precipitated silica contain as well the particles prepared by primary aggregation of the particles having a fine particle diameter and the particles prepared by slight secondary aggregation of the above particles.

Measurement by the acoustic measuring equipment of particle size distribution is carried out after subjecting a 0.01M KCl aqueous solution of precipitated silica to dispersion treatment by a ultrasonic wave for 5 minutes to remove bubbles and break secondary aggregates. Particle diameters of the primary aggregates of precipitated silica and distribution of the particle numbers thereof are obtained, and assuming that among them, a diameter of the particles observed in the highest frequency is set to $A_{ac}$ (nm), the following equation:

$$A_{ac} \geq -0.76 \times (CTAB) + 274 \tag{I}$$

is satisfied, and the rubber composition is improved in both of low heat build-up and abrasion resistance. When $A_{ac}$ does not satisfy the above condition, the rubber composition is reduced in either or both of low heat build-up and abrasion resistance. Further, $A_{ac}$ is preferably 1 μm or less. If it is larger than 1 μm, precipitated silica is likely to become a breaking nucleus to damage the kinetic properties of the rubber composition.

Further, a difference between a reduction (%) in a mass of precipitated silica used in the present invention when heating it and a reduction (%) in a mass thereof when igniting it is preferably:

$$\text{(ignition loss)} - \text{(heating loss)} \leq 3 \tag{II}$$

The heating loss and the ignition loss are measured according to a test method of a compounding ingredient for rubber prescribed in JIS K6220-1, wherein the heating loss is a reduction (%) in the mass when heated usually at 105±2° C. for 2 hours, and the ignition loss is a reduction (%) in the mass when ignited usually at 750±25° C. for 3 hours.

A use amount of precipitated silica used in the present invention is 10 to 150 parts by mass based on 100 parts by mass of the rubber component, preferably 100 parts by mass of the modified natural rubber described above or 100 parts by mass of the total of the modified natural rubber and the modified synthetic rubber.

If a use amount of precipitated silica is less than 10 parts by mass, the effects of the present invention can not be exerted, and on the other hand, if it exceeds 150 parts by mass, the processability is reduced.

Precipitated silica used in the present invention is produced according to a production process for precipitation process hydrated silica. For example, sodium silicate and sulfuric acid are added to a reaction vessel filled in advance with a fixed amount of warm water in a fixed time while controlling pH and temperature to obtain a precipitated silica slurry.

Subsequently, the above precipitated silica slurry is separated by filtrating through a filtering device capable of washing a cake, such as a filter press and washed to remove by-produced electrolytes, and then a slurry is prepared from a precipitated silica cake obtained and dried by means of a dryer such as a spray dryer to thereby produce precipitated silica.

In the present invention, a silane coupling agent is preferably used. The silane coupling agent is reacted with silanol groups remaining on a surface of the precipitated silica and the rubber component polymer to act as a bonding bridge between the precipitated silica and the rubber and to form a reinforcing phase.

The silane coupling agent used in the present invention is at least one selected from the group consisting of compounds represented by formulas shown below:

$$A_m B_{3-m} Si-(CH_2)_a-S_b-(CH_2)_a-SiA_m B_{3-m} \tag{VIII}$$

(wherein A is $C_n H_{2n+1} O$ (n is an integer of 1 to 3) or a chlorine atom; B is an alkyl group having 1 to 3 carbon atoms; m is an integer of 1 to 3; a is an integer of 1 to 9; b is an integer of 1 or more and may have distribution; provided that when m is 1, two B may be same or different and that when m is 2 or 3, two or three A may be same or different);

$$A_m B_{3-m}-Si-(CH_2)_c-Y \tag{IX}$$

(wherein A is $C_n H_{2n+1} O$ (n is an integer of 1 to 3) or a chlorine atom; B is an alkyl group having 1 to 3 carbon atoms; Y is a mercapto group, a vinyl group, an amino group, a glycidoxy group or an epoxy group; m is an integer of 1 to 3; c is an integer of 0 to 9; provided that when m is 1, two B may be same or different and that when m is 2 or 3, two or three A may be same or different); and $$A_m B_{3-m} Si-(CH_2)_a-S_b-Z \tag{X}$$

(wherein A is $C_n H_{2n+1} O$ (n is an integer of 1 to 3) or a chlorine atom; B is an alkyl group having 1 to 3 carbon atoms; Z is a benzothiazolyl group, a N,N-dimethylthiocarbamoyl group or a methacryloyl group; m is an integer of 1 to 3; a is an integer of 1 to 9; b is an integer of 1 or more and may have distribution; provided that when m is 1, two B may be same or different and that when m is 2 or 3, two or three A may be same or different).

To be specific, the silane coupling agent represented by Formula (III) includes bis-(3-triethoxysilylpropyl)tetrasulfide, bis-(3-trimethoxysilylpropyl)tetrasulfide, bis-(3-methyldimethoxysilylpropyl)tetrasulfide, bis-(3-triethoxysilylethyl)tetrasulfide, bis-(3-triethoxysilylpropyl)disulfide, bis- (3-trimethoxysilylpropyl)disulfide and bis-(3-triethoxysilylpropyl)trisulfide; the silane coupling agent represented by Formula (IX) includes 3-mercaptopropyltrimethoxysilane, 3-mercaptopropyltriethoxysilane, 3-mercaptopropylmethyldimethoxysilane, vinyltrimethoxysilane, vinyltriethoxysilane, 3-aminopropyltrimethoxysilane, 3-aminopropyltriethoxysilane, γ-glycidoxypropyltrimethoxysilane and γ-glycidoxypropylmethyldiethoxysilane; and the silane coupling agent represented by Formula (X) includes 3-trimethoxysilylpropyl-N,N-dimethylthiocarbamoyl tetrasulfide, 3-trimethoxysilylpropylbenzothiazolyl tetrasulfide and 3-trimethoxysilylpropylmethacryloyl monosulfide.

A use amount of the silane coupling agent is preferably 1 to 20% by mass based on an amount of precipitated silica. If the use amount is less than 1% by mass, the sufficiently high coupling effect is not obtained in a certain case, and if it exceeds 20% by mass, gelation of the polymer is brought about in a certain case.

In the rubber composition of the present invention, carbon black such as SAF, HAF, ISAF, FEF, and GPF can be further used as a reinforcing filler together with the structural precipitated silica described above. Abrasion resistance of the rubber composition can be further improved by compounding carbon black.

A use amount of the carbon black is preferably 80 parts by mass or less based on 100 parts by mass of the rubber component, and a total compounding amount obtained by summing the carbon black and the precipitated silica is preferably 120 parts by mass or less. Controlling the total compounding amount to 120 parts by mass or less based on 100 parts by mass of the rubber component makes it possible to improve sufficiently the low heat build-up and the abrasion resistance.

Further, in addition to the structural precipitated silica and carbon black described above, an inorganic compound represented by the following Formula (XI) can be used as long as the effects of the present invention are not damaged:

$$mM \cdot xSiO_y \cdot zH_2O \quad \text{(XI)}$$

(wherein M is at least one selected from metal selected from the group consisting of aluminum, magnesium, titanium, calcium and zirconium, oxides or hydroxides of the metals, and hydrates thereof and carbonates of the metals, and m, x, y and z are an integer of 1 to 5, an integer of 0 to 10, an integer of 2 to 5 and an integer of 0 to 10 respectively).

Capable of being listed as the inorganic compound represented by Formula (XI) described above are alumina ($Al_2O_3$) such as γ-alumina and α-alumina; alumina monohydrate ($Al_2O_3 \cdot H_2O$) such as boehmite and diaspore; aluminum hydroxide ($Al(OH)_3$) such as gibbsite and bayerite; aluminum carbonate ($Al_2(CO_3)_3$), magnesium hydroxide ($Mg(OH)_2$), magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$),calcium oxide (CaO), calcium hydroxide ($Ca(OH)_2$), magnesium aluminum oxide ($MgO \cdot Al_2O_3$), clay ($Al_2O_3 \cdot 2SiO_2$), kaolin ($Al_2O_3 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$ and the like), magnesium silicate ($Mg_2SiO_4$, $MgSiO_3$ and the like), calcium silicate ($Ca_2SiO_4$ and the like), calcium aluminum silicate ($Al_2O_3 \cdot CaO \cdot 2SiO_2$ and the like), calcium magnesium silicate ($CaMgSiO_4$), calcium carbonate ($CaCO_3$), zirconium oxide ($ZrO_2$), zirconium hydroxide ($ZrO(OH)_2 \cdot nH_2O$), zirconium carbonate ($Zr(CO_3)_2$), crystalline aluminosilicates containing hydrogen, alkali metal or alkaline earth metal which corrects an electric charge, such as various zeolites. The reinforcing fillers may be used alone or in a mixture of two or more kinds thereof.

The rubber composition of the present invention can be compounded, if necessary, with various compounding ingredients usually used in the rubber industry, for example, other reinforcing fillers, vulcanizing agents, vulcanization accelerators, antioxidants, softening agents and the like as long as the objects of the present invention are not damaged.

The rubber composition of the present invention is obtained by kneading the components by means of an open type mixer such as a roll mill and an internal mixer such as a Banbury mixer, and it is vulcanized after subjected to molding processing and can be applied to various tire members.

The tire of the present invention is characterized by using the rubber composition described above for any of tire members. In this respect, in the tire of the present invention, the rubber composition is used particularly preferably for a tread rubber. Tires prepared by using the rubber composition for a tread are excellent in processability due to a synergistic effect of the modified natural rubber and the structural precipitated silica described above, and they have low rolling resistance due to the low heat build-up and are excellent in abrasion resistance. Ordinary air or air in which an oxygen partial pressure is changed or inert gas such as nitrogen can be used for gas charged into the tire of the present invention.

EXAMPLES

Next, the present invention shall be explained in further detail with reference to production examples for modified natural rubbers, production examples for modified synthetic rubbers, production examples for precipitated silica, examples and comparative examples, but the present invention shall by no means be restricted to examples shown below.

Also, the physical properties of precipitated silica, low heat build-up, abrasion resistance and processability of the rubber compositions and the tire performances in the examples and the comparative examples were measured and evaluated by the following methods.

Production Example 1 of Modified Natural Rubber

Natural Rubber Latex Modifying Step:
A field latex was centrifugally separated at a revolution of 7500 rpm by means of a latex separator (manufactured by Saito Separator Limited) to obtain a concentrated latex having a dry rubber concentration of 60%. The concentrated latex 1000 g was put into a stainless-made reaction vessel equipped with a stirrer and a temperature-controlling jacket, and an emulsion prepared in advance by adding 10 mL of water and 90 mg of an emulsifier (Emulgen 1108, manufactured by Kao Corporation) to 3.0 g of N,N-diethylaminoethyl methacrylate was added thereto together with 990 mL of water, followed by stirring them at ambient temperature for 30 minutes while substituting with nitrogen. Next, 1.2 g of tert-butyl hyperoxide as a polymerization initiator and 1.2 g of tetraethylenepentaamine were added thereto to carry out reaction at 40° C. for 30 minutes, whereby a modified natural rubber latex was obtained.

Coagulating and Drying Step:
Formic acid was added to the modified natural rubber latex described above to control pH to 4.7, whereby the modified natural rubber latex was coagulated. A coagulum thus obtained was treated five times by means of a craper and allowed to pass through a shredder to turn it into a crumb, and then it was dried at 110° C. for 210 minutes by means of a hot air dryer to obtain modified natural rubber A. It was confirmed from a mass of the modified natural rubber A thus obtained that a conversion rate of N,N-diethylaminoethyl methacrylate added as the monomer was 100%. Further, the modified natural rubber A was extracted with petroleum ether and further extracted with a 2:1 mixed solvent of acetone and methanol to thereby try to separate a homopolymer, but the extract was analyzed to find that a homopolymer was not detected. It was confirmed that 100% of the monomer added was introduced into the natural rubber molecule. Accordingly, a polar group content of the modified natural rubber A obtained was 0.027 mmol/g based on the rubber component contained in the natural rubber latex.

Production Example 2 of Modified Natural Rubber

Modified natural rubber B was obtained in the same manner as in Production Example 1 described above, except that 2.1 g of 2-hydroxyethyl methacrylate was added as a monomer in place of 3.0 g of N,N-diethylaminoethyl methacrylate. Further, the modified natural rubber B was analyzed in the same manner as in the modified natural rubber A to confirm that 100% of the monomer added was introduced into the natural rubber molecule. Accordingly, a polar group content of the modified natural rubber B was 0.027 mmol/g based on the rubber component contained in the natural rubber latex.

Production Example 3 of Modified Natural Rubber

Modified natural rubber C was obtained in the same manner as in Production Example 1 described above, except that 1.7 g of 4-vinylpyridine was added as a monomer in place of 3.0 g of N,N-diethylaminoethyl methacrylate. Further, the modified natural rubber C was analyzed in the same manner as in the modified natural rubber A to confirm that 100% of the monomer added was introduced into the natural rubber molecule. Accordingly, a polar group content of the modified natural rubber C is 0.027 mmol/g based on the rubber component contained in the natural rubber latex.

Production Example 4 of Modified Natural Rubber

Water was added to a field latex to obtain a latex having a dry rubber concentration of 30%. The latex 2000 g was put into a stainless-made reaction vessel equipped with a stirrer and a temperature-controlling jacket, and an emulsion obtained by adding in advance 10 mL of water and 90 mg of an emulsifier (Emulgen 1108, manufactured by Kao Corporation) to 1.2 g of 2-mercaptoethylamine was added thereto to carry out reaction at 60° C. for 8 hours with stirring, whereby a modified natural rubber latex D was obtained. Then, the latex was coagulated and dried in the same manners as in Production Example 1 to thereby obtain modified natural rubber D. Further, a polar group content of the modified natural rubber D obtained was analyzed by means of a pyrolysis gas chromatography mass spectrometer to find that it was 0.021 mmol/g based on the rubber component contained in the natural rubber latex.

Production Example 5 of Modified Natural Rubber

Modified natural rubber E was obtained in the same manner as in Production Example 4 described above, except that 1.8 g of 2-mercaptopyridine was added as a polar group-containing mercapto compound in place of 1.2 g of 2-mercaptoethylamine. Further, a polar group content of the modified natural rubber E obtained was analyzed by means of a pyrolysis gas chromatography mass spectrometer to find that it was 0.022 mmol/g based on the rubber component contained in the natural rubber latex.

Production Example 6 of Modified Natural Rubber

The concentrated latex described above 1000 g was put into a stainless-made reaction vessel equipped with a stirrer and a temperature-controlling jacket, and an emulsion prepared in advance by adding 10 mL of water and 90 mg of the emulsifier (Emulgen 1108, manufactured by Kao Corporation) to 3.0 g of N,N-diethylaminoethyl methacrylate was added thereto together with 990 mL of water, followed by stirring them for 30 minutes while substituting with nitrogen. Next, 3.0 g of bis(tricyclohexylphosphine)benzylideneruthenium dichloride as a metathesis catalyst was added thereto to carry out reaction at 40° C. for 7 hours, whereby modified natural rubber latex F was obtained. Then, the latex was coagulated and dried in the same manners as in Production Example 1 to thereby obtain modified natural rubber F. It was confirmed from a mass of the modified natural rubber F thus obtained that a conversion rate of N,N-diethylaminoethyl methacrylate added was 84%. Further, the modified natural rubber F was extracted with petroleum ether and further extracted with a 2:1 mixed solvent of acetone and methanol to thereby try to separate a reaction product of the olefins themselves which were not introduced into the natural rubber molecule, and the reaction product of the olefins themselves which were not introduced into the natural rubber molecule was detected in 6% of an amount of the charged olefin. Accordingly, a polar group content of the modified natural rubber F was 0.021 mmol/g based on the rubber component contained in the natural rubber latex.

Production Example 7 of Modified Natural Rubber

Formic acid was added to a field latex to control pH to 4.7, whereby the latex was coagulated, and a coagulum thus obtained was further treated five times by means of a craper and allowed to pass through a shredder to turn it into a crumb. Next, a dried rubber content of the coagulum obtained was determined, and 600 g of the coagulum in terms of a dried rubber amount, 3.0 g of N,N-diethylaminoethyl methacrylate and 1.2 g of tert-butyl hydroperoxide (t-BHPO) were kneaded at room temperature for 2 minutes at 30 rpm in a mixer and evenly dispersed. Next, a mixture obtained was extruded while adding evenly 1.2 g of tetraethylenepentaamine (TEPA) to the mixture and applying mechanical shearing force at a barrel temperature of 120° C. and a revolution of 100 rpm by means of a twin screw kneading extruder (rotating screw diameter in the same direction=30 mm, L/D=35, vent hole: 3 sites) manufactured by Kobe Steel. Ltd., whereby dried modified natural rubber G was obtained. Also, it was found from a mass of the modified natural rubber G thus obtained that a conversion rate of N,N-diethylaminoethyl methacrylate added as the monomer was 83%. Further, the modified natural rubber G was extracted with petroleum ether and further extracted with a 2:1 mixed solvent of acetone and methanol to thereby try to separate a homopolymer, and a homopolymer was detected in 7% of an amount of the charged olefin. Accordingly, a polar group content of the modified natural rubber G was 0.021 mmol/g based on the solid rubber component contained in the natural rubber raw material.

Production Example 1 of Modified Synthetic Rubber

A glass pressure vessel having a volume of 900 ml which was dried and substituted with nitrogen was charged with 283 g of cyclohexane, 50 g of 1,3-butadiene, 0.0057 mmol of 2,2-ditetrahydrofurylpropane and 0.513 mmol of hexamethyleneimine each in the form of a cyclohexane solution, and 0.57 mmol of n-butyllithium (n-BuLi) was added thereto. Then, polymerization reaction was carried out for 4.5 hours in a warm water bath of 50° C. equipped with a stirrer. The polymerization conversion rate in the above case was almost 100%. Next, 0.100 mmol of tin tetrachloride was added to the polymerization system in the form of a cyclohexane solution, and the mixture was stirred at 50° C. for 30 minutes. Then, 0.5 mL of an isopropanol solution (BHT concentration: 5% by mass) of 2,6-di-t-butyl-p-cresol (BHT) was added to the reaction system to terminate the polymerization reaction, and further, the substance was dried according to an ordinary method to obtain modified synthetic rubber I (modified polybutadiene rubber). A vinyl bond (1,2-bond) content of the modified synthetic rubber I thus obtained was determined from an integral ratio in a $^1$H-NMR (Alpha 400 MHz NMR apparatus, manufactured by JEOL Ltd., in CDCl$_3$) spectrum to find that the vinyl bond content of the butadiene unit was 14% by mass. Further, a coupling efficiency of the modified synthetic rubber I obtained was calculated using a peak area ratio in a high molecular weight side out of the data obtained from gel permeation chromatography (GPC) to find that the coupling efficiency was 65%. Also, the modified synthetic rubber I had a glass transition temperature was −95° C.

Production Example 2 of Modified Synthetic Rubber

A hexane solution of a 1,3-butadiene monomer 0.5 g, a hexane solution of neodymium neodecanoate 0.32 mmol, a toluene solution of methylaluminoxane 31.7 mmol and a hexane solution of diisobutylaluminum hydride 6.67 mmol were mixed in a rubber partition-provided bottle which was dried and washed by nitrogen purge to thereby prepare a catalyst. The mixture was brought into contact for 2 minutes, and then a hexane solution of diethylaluminum chloride 1.27 mmol was further added thereto. Next, the mixture was ripened at room temperature for 15 minutes.

The catalyst solution prepared in the manner described above and 611 g of a 1,3-butadiene monomer were added to about 3459 g of hexane and mixed at 25° C. in a stainless-made reaction vessel of 2 gallons equipped with a stirrer and a temperature-controlling jacket, whereby a polybutadiene polymer was formed. The mixture was stirred at 24° C. for about 10 minutes. A temperature of the jacket was elevated up to 72° C. to continue stirring for 33 minutes, and then a temperature of the jacket was lowered down to 70° C. The polymer cements were sampled and put into separate bottles which were dried and washed by nitrogen purge.

Next, 50 equivalents of 4-(N,N-diethylamino)benzophenone (DEAB) based on neodymium was added thereto in the form of a toluene solution to carry out reaction at 50° C. for about 180 minutes, and then after it was quenched by small amounts of isopropyl alcohol and 2,6-di-t-butyl-4-methylphenol (BHT) which were dissolved in hexane, it was coagulated in isopropyl alcohol to isolate a polymer. Next, the polymer was dried on a drum to obtain modified synthetic rubber J. The modified synthetic rubber J thus obtained was analyzed by FTIR to find that it comprised 93% of a cis structure.

Production Example 3 of Modified Synthetic Rubber

Modified synthetic rubber K was obtained in the same manner as in Production Example 2 of a modified synthetic rubber described above, except that N,N'-dimethylimidazolidinone was added in place of DEAB.

Production Example 4 of Modified Synthetic Rubber

A glass-made separable flask of 2 liters equipped with a stirrer and a thermostat was charged with 130 g of a polybutadiene rubber (UBEPOL-150L, manufactured by Ube Industries, Ltd.) produced by a cobalt base catalyst and 1.2 L of toluene, and the mixture was heated up to 60° C. with stirring to completely dissolve the polybutadiene rubber. Next, a modifying agent of 2,4-dinitrobenzenesulfenyl chloride 39 mmol which was dissolved in advance in tetrahydrofuran was added thereto to carry out modification reaction at 60° C. for 2 hours. After finishing the reaction, the reaction liquid was cooled down to room temperature and transferred into a 3 liter flask, and 1.2 L of methanol was added thereto to precipitate modified polybutadiene. The precipitated modified polybutadiene was separated by a metal gauze of 300 mesh, and tetrakis[methylene-3-(3',5'-di-t-butyl-4'-hydroxyphenyl)propionate]methane] (Irganox 1010, manufactured by Nihon Ciba Geigy K. K.) as an antioxidant was blended and kneaded therewith in a proportion of 1000 ppm based on the polybutadiene rubber, followed by vacuum-drying it at 100° C. for 1 hour to obtain modified synthetic rubber L.

Production Example 5 of Modified Synthetic Rubber

A rubber stopper-provided glass bottle having a volume of 100 mL which was dried and substituted with nitrogen was charged in the following order with 7.11 g of a cyclohexane solution (15.2% by mass) of 1,3-butadiene, 0.59 mL of a cyclohexane solution (0.56M) of neodymium neodecanoate, 10.32 mL of a toluene solution (3.23M in terms of an aluminum concentration) of methylaluminoxane MAO (manufactured by Tosoh Akzo Corporation) and 7.77 mL of a hexane solution (0.90M) of diisobutylaluminum hydride (manufactured by Kanto Chemical Co., Inc.) to ripen the mixture at room temperature for 2 minutes, and then 1.45 mL of a hexane solution (0.95M) of diethylaluminum chloride (manufactured by Kanto Chemical Co., Inc.) was added thereto to ripen the mixture at room temperature for 15 minutes while sometimes stirring. A concentration of neodymium in the catalyst solution thus obtained was 0.11M (mol/L). Next, a rubber stopper-provided glass bottle having a volume of about 900 mL was dried, substituted with nitrogen and charged with a cyclohexane solution of 1,3-butadiene which was dried and refined and dried cyclohexane respectively to assume a state in which 400 g of a 12.5 mass % cyclohexane solution of 1,3-butadiene was added. Next, the bottle was charged with 2.28 mL (0.025 mmol in terms of neodymium) of the catalyst solution prepared above to carry out polymerization for 1.0 hour in a warm bath of 50° C.

Next, 23.5 equivalent (based on neodymium) of 3-glycidoxypropyltrimethoxysilane was added thereto as a primary modifying agent in the form of a hexane solution (1.0M) and treated at 50° C. for 60 minutes. Subsequently, 1.2 mL of sorbitan trioleate (manufactured by Kanto Chemical Co., Inc.) was added thereto in the form of a single substance to further carry out modification reaction at 50° C. for 1 hour, and then 2 mL of an isopropanol 5% solution of 2,2'-methylene-bis(4-ethyl-t-butylphenol) (NS-5) as an antioxidant was added to the polymerization system to terminate the reaction. Further, re-precipitation was carried out in isopropanol containing a trace amount of NS-5, and the precipitate was dried on a drum to obtain modified synthetic rubber M (modified polybutadiene rubber).

Production Example 6 of Modified Synthetic Rubber

A rubber stopper-provided glass pressure bottle of 800 mL which was dried and substituted with nitrogen was charged with 300 g of cyclohexane, 40 g of 1,3-butadiene, 14 g of styrene, 0.2 mmol of ditetrahydrofurylpropane and 0.48 mmol of hexamethyleneimine (HMI) and further charged with 0.48 mmol of n-butyllithium (n-BuLi), and then polymerization reaction was carried out at 50° C. for 1.5 hour. In this case, the polymerization conversion rate was almost 100%. Next, 0.12 mmol of tin tetrachloride as a modifying agent was added quickly to the polymerization reaction system, and modification reaction was further carried out at 50° C. for 30 minutes. Then, 0.5 mL of an isopropanol solution (BHT concentration: 5% by mass) of 2,6-di-t-butyl-p-cresol (BHT) was added to the polymerization system to terminate the polymerization reaction, and further, the substance was dried according to an ordinary method to obtain modified synthetic rubber N (modified styrene-butadiene copolymer).

A number average molecular weight (Mn) and a weight average molecular weight (Mw) of the modified synthetic rubber N obtained were determined based on monodispersed polystyrene by means of a gel permeation chromatography (GPC: HLC-8020, manufactured by Tosoh Corporation, column: GHM-XL (two columns in series) manufactured by Tosoh Corporation, detector: differential refractometer (RI)) to find that the modified synthetic rubber N had a number average molecular weight (Mn) of $221\times10^3$ before the modification reaction carried out by tin tetrachloride and a weight average molecular weight (Mw) of $662\times10^3$ after the modification reaction carried out by tin tetrachloride. Also, a bonded styrene content of the modified synthetic rubber N obtained was determined from an integral ratio of a $^1$H-NMR spectrum to find that the bonded styrene content was 26%. Further, a glass transition point of the modified synthetic rubber N obtained was measured by cooling it down to $-100°$ C. and then heating it at a heating rate of 10° C./minute by means of a differential thermal analysis equipment (DSC) 7 type manufactured by Perkin Elmer Co., Ltd. to find that the glass transition point was $-38°$ C.

Production Example 7 of Modified Synthetic Rubber

Modified synthetic rubber O (modified styrene-butadiene copolymer) was produced in the same manner as in Production Example 6 of a modified synthetic rubber described above, except that hexamethyleneimine was not added. The modified synthetic rubber O had a number average molecular weight (Mn) of $218\times10^3$ before the modification reaction, a weight average molecular weight (Mw) of $615\times10^3$ after the modification reaction, a bonded styrene content of 26% and a glass transition point of $-38°$ C.

Production Example 8 of Modified Synthetic Rubber

A stainless-made polymerization reactor having a volume of 2 L was washed, dried and substituted with dried nitrogen, and then it was charged with 1480 g of 1,3-butadiene, 520 g of styrene, 122 g of tetrahydrofuran, 10.2 kg of hexane and n-butyllithium (11.0 mmol of a n-hexane solution), and polymerization was carried out at 65° C. for 3 hours under stirring. After finishing the polymerization, 11.0 mmol of 1-(4-N,N-dimethylaminophenyl)-1-phenylethylene was added thereto, and reaction was carried out for 60 minutes under stirring. Then, 11.0 mmol of 1,3-dimethyl-2-imidazilidinone which was cyclic amine was added thereto to carry out reaction for 30 minutes under stirring, and then methanol was added and stirred for further 5 minutes. Thereafter, a content of the polymerization reactor was taken out, and 10 g of 2,6-di-t-butyl-p-cresol (Smilizer BHT, manufactured by Sumitomo Chemical Co., Ltd.) was added thereto. A large part of hexane was vaporized, and then the residue was dried under reduced pressure at 55° C. for 12 hours to obtain modified synthetic rubber P (modified styrene-butadiene copolymer).

Production Example 9 of Modified Synthetic Rubber

A polymerization vessel which was substituted with nitrogen was charged with 200 parts by mass of water, 4.5 parts by mass of rosined soap, 71.5 parts by mass of 1,3-butadiene, 28 parts by mass of styrene, 1.0 part by mass of diethylaminoethyl methacrylate and 0.3 part by mass of t-dodecylmercaptan. Then, a temperature of the polymerization vessel was set to 5° C., and 0.1 part by mass of p-methanehydrpperoxide as a polymerization initiator, 0.07 part by mass of sodium ethylenediaminetetraacetate, 0.05 part by mass of ferrous sulfate heptahydrate and 0.15 part by mass of sodium formaldehyde sulfoxylate were added thereto to initiate polymerization. When the polymerization conversion rate reached 60%, diethylhydroxyamine was added thereto to terminate the polymerization. Then, the unreacted monomers were recovered by steam stripping to obtain an aqueous dispersion of a styrene-butadiene copolymer having a solid concentration of 21%. Thereafter, the styrene-butadiene copolymer aqueous dispersion was coagulated by sulfuric acid and sodium chloride and turned into a crumb, and it was dried by means of a hot air dryer to obtain modified synthetic rubber Q. The modified synthetic rubber Q had a bonded styrene content of 23.5% by mass and a Mooney viscosity of 47.

Physical Properties of Precipitated Silica:

(1) Acoustic Measurement of Particle Size Distribution Diameter:

A 0.01M KCl aqueous solution of each precipitated silica was subjected to dispersion treatment for 5 minutes by a ultrasonic wave to remove bubbles, and then the mode $A_{ac}$ (nm) in diameters of primary aggregates of the precipitated silica was measured by means of a supersonic measuring equipment of particle size distribution DT1200 (manufactured by Dispersion Technology, Inc.).

(2) Measurement of CTAB:

CTAB was measured according to a method described in ASTM D3765-92. The method described in ASTM D3765-92 is a method for measuring CTAB of carbon black, and therefore it was slightly modified. That is, IRB #3 (83.0 m$^2$/g) which was a standard product of carbon black was not used, and a cetyltrimethylammonium bromide (hereinafter abbreviated as CE-TRAB) standard solution was prepared separately. This was used to standardize a precipitated silica OT (sodium di-2-ethylhexylsulfosuccinate) solution to calculate a specific surface area (m$^2$/g) from an adsorbing amount of CE-TRAB assuming that an adsorbing cross-sectional area per one molecule of CE-TRAB onto a surface of precipitated silica was set to 0.35 nm$^2$. This is because it is considered that carbon black and precipitated silica are different in a surface, so that they are different in a adsorbing amount of CE-TRAB even if they have the same surface area.

(3) Measurement of Heating Loss and Ignition Loss:

A sample of precipitated silica was weighed and heated at 105±2° C. for 2 hours in a case of the heating loss and at 750±25° C. for 3 hours in a case of the ignition loss, and then the masses thereof were measured to represent a difference from a mass of the sample before heated by % based on a mass thereof before heated.

(4) Rolling Resistance of Tire:

A pneumatic tire having a tire size of 185/70R14 was provided with an inner pressure of 170 kPa, and then it was allowed to run on a large size test drum at a speed of 80 km/hour for a prescribed time under applying a load of 395 kg. Next, driving force of the drum described above was cut off to leave it inertially running, and rolling resistance of the tire was determined from speed reduction of the tire and shown by an index, wherein the value obtained in the comparative example was set to 100. The larger the index is, the smaller the rolling resistance is, and it is preferred.

(5) Abrasion Resistance of Tire:

Determined from a depth of remaining grooves after allowing the same tire as used for evaluating rolling resistance of the tire to run 10,000 km on domestic city roads. It was shown by an index, wherein the value obtained in the comparative example was set to 100. The larger the index is, the better the abrasion resistance is.

(6) Processability:

The Mooney viscosity ($ML_{1+4}$, 130° C.) was measured under the conditions of preliminary heating for 1 minute, a rotor working time of 4 minutes and a temperature of 130° C. using a L rotor according to JIS K6300-1994, and it was shown by an index, wherein that of Comparative Example 1 was set to 100. It is shown that the larger the value is, the worse the processability is.

Production of Precipitated Silica

Production Example A

A jacket-installed stainless-made reaction vessel of a volume of 180 L equipped with a stirrer was charged with 93 L of water and 0.6 L of a sodium silicate aqueous solution ($SiO_2$ 160 g/L, $SiO_2/Na_2O$ mole ratio: 3.3) and heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 55 g/L. Subsequently, sulfuric acid having the concentration described above was added until pH of the solution was 3 to obtain a silica slurry. The silica slurry thus obtained was filtrated by means of a filter press, and the filtrated solid was washed with water to obtain a wet cake. Then, the wet cake was turned into a slurry by means of an emulsifying equipment, and the slurry was dried by means of a spray dryer to obtain wet process precipitated silica A.

Production Example B

The same vessel as used in Production Example A was charged with 93 L of water and 0.6 L of the sodium silicate aqueous solution which were the same raw materials as used in Production Example A, and the mixture was heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 30 minutes. A concentration of silica in the resulting solution was 55 g/L. Subsequently, sulfuric acid having the concentration described above was added until pH of the solution was 3 to obtain a silica slurry. Then, wet process precipitated silica B was obtained by the same method as in Production Example A.

Production Example C

The same vessel as used in Production Example A was charged with 93 L of water and 0.6 L of the sodium silicate aqueous solution which were the same raw materials as used in Production Example A, and the mixture was heated up to 84° C. A concentration of $Na_2O$ in the resulting solution was 0.005 mol/L.

While maintaining the above solution at a temperature of 84° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 48 minutes, and the solution was gelatinized. Addition was further continued, and the reaction was terminated in 90 minutes. After terminating the reaction, a temperature of the reaction liquid was maintained at 84° C. for 30 minutes. A concentration of silica in the resulting solution was 55 g/L. Subsequently, sulfuric acid having the concentration described above was added until pH of the solution was 3 to obtain a silica slurry. Then, wet process precipitated silica C was obtained by the same method as in Production Example A.

Production Example D

The same vessel as used in Production Example A was charged with 93 L of water and 0.6 L of the sodium silicate aqueous solution which were the same raw materials as used in Production Example A, and the mixture was heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 60 minutes. A concentration of silica in the resulting solution was 55 g/L. Subsequently, sulfuric acid having the concentration described above was added until pH of the solution was 3 to obtain a silica slurry. Then, wet process precipitated silica D was obtained by the same method as in Production Example A.

Production Example E

The same vessel as used in Production Example A was charged with 93 L of water and 0.6 L of the sodium silicate aqueous solution which were the same raw materials as used in Production Example A, and the mixture was heated up to 78° C. A concentration of $Na_2O$ in the resulting solution was 0.005 mol/L.

While maintaining the above solution at a temperature of 78° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 49 minutes, and the solution was gelatinized. Addition was further continued, and the reaction was terminated in 90 minutes. After terminating the reaction, a temperature of the reaction liquid was maintained at 78° C. for 60 minutes. A concentration of silica in the resulting solution was 55 g/L. Subsequently, sulfuric acid having the concentration described above was added until pH of the solution was 3 to obtain a silica slurry. Then, wet process precipitated silica E was obtained by the same method as in Production Example A.

Production Example F

The same vessel as used in Production Example A was charged with 93 L of water and 0.6 L of a sodium silicate aqueous solution, and the mixture was heated up to 65° C. A concentration of $Na_2O$ in the resulting solution was 0.005 mol/L.

While maintaining the above solution at a temperature of 65° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 50 minutes, and the solution was gelatinized. Addition was further continued, and the reaction was terminated in 90 minutes. After terminating the reaction, a temperature of the reaction liquid was maintained at 65° C. for 60 minutes. A concentration of silica in the resulting solution was 55 g/L. Subsequently, sulfuric acid having the concentration described above was added until pH of the solution was 3 to obtain a silica slurry. Then, wet process precipitated silica F was obtained by the same method as in Production Example A.

Production Example G

The same vessel as used in Production Example A was charged with 86 L of water and 0.5 L of the sodium silicate aqueous solution which were the same raw materials as used in Production Example A, and the mixture was heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 615 ml/minute and sulfuric acid (18 mol/L) at a flow rate of 27 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 40 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 62 g/L. Subsequently, sulfuric acid having the concentration described above was added until pH of the solution was 3 to obtain a silica slurry. Then, wet process precipitated silica G was obtained by the same method as in Production Example A.

Examples 1 to 8 and Comparative Examples 1 to 6

Rubber compositions comprising compounding ingredients of kinds and amounts each shown in Table 1 were prepared according to an ordinary method by using in Examples 1 to 8, the modified natural rubbers prepared in Production Examples 1 and 2 described above and the precipitated silicas A to G produced respectively in Production Examples A to G; in Comparative Example 1, using RSS #3 as a natural rubber and Nipsil AQ manufactured by Tosoh Silica Corporation; in Comparative Example 2, using RSS #3 as a natural rubber and ULTRASIL VN2 manufactured by Degussa AG.; in Comparative Examples 3 and 4, using RSS #3 as a natural rubber and precipitated silicas B and C; and in Comparative Examples 5 and 6, using the modified natural rubbers prepared in Production Examples 1 and 2 described above and Nipsil AQ manufactured by Tosoh Silica Corporation.

The physical properties of the precipitated silicas used in the respective examples and comparative examples, the physical properties of unvulcanized rubbers and the tire performances are shown in the following Table 2 and Table 3.

TABLE 1

| Compounding formulation | Parts by mass |
| --- | --- |
| Rubber component (shown in Table 2) | 100 |
| Carbon black[*1] | 15 |
| Precipitated silica[*2] | 65 |
| Organic silicon[*3] | 5.2 |
| Stearic acid | 2 |
| Antioxidant 6C[*4] | 1.5 |
| Zinc oxide | 3 |
| Vulcanization accelerator DPG[*5] | 0.5 |
| Vulcanization accelerator NS[*6] | 1 |
| Sulfur | 1.5 |

The terms [*1] to [*6] in Table 1 shown above mean the followings:
[*1]Seast KH (N339) (manufactured by Tokai Carbon Co., Ltd.)
[*2]Precipitated silicas A to G in Production Examples A to G
[*3]Silane coupling agent Si75 (manufactured by Degussa AG.)
[*4]N-(1,3-dimethylbutyl)-N'-phenyl-p-phenylenediamine
[*5]Diphenylguanidine
[*6]N-t-butyl-2-benzothiazylsulfeneamide

TABLE 2

|  | Example | | | | | | | |
|---|---|---|---|---|---|---|---|---|
|  | 1 | 2 | 3 | 4 | 5 | 6 | 7 | 8 |
| Kind of precipitated silica | A | B | C | D | E | F | G | B |
| Modified natural rubber | | | | Production Example 1 | | | | Production Example 2 |
| Physical properties of precipitated silica | | | | | | | | |
| CTAB (m²/g) | 112 | 134 | 157 | 127 | 172 | 210 | 80 | 134 |
| Particle size distribution diameter $A_{ac}$ (nm) | 208 | 178 | 158 | 192 | 149 | 125 | 213 | 178 |
| −0.76 × CTAB + 274 | 189 | 172 | 155 | 177 | 143 | 114 | 212 | 172 |
| Ignition loss − heating loss (% by mass) | 2.6 | 2.6 | 2.1 | 2.2 | 2.9 | 2.9 | 2.8 | 2.6 |
| Rolling resistance (index) | 116 | 114 | 113 | 115 | 115 | 113 | 117 | 109 |
| Abrasion resistance (index) | 136 | 129 | 126 | 130 | 132 | 138 | 120 | 118 |
| Processability (index) | 88 | 93 | 97 | 90 | 102 | 107 | 84 | 87 |

TABLE 3

|  | Comparative Example | | | | | |
|---|---|---|---|---|---|---|
|  | 1 | 2 | 3 | 4 | 5 | 6 |
| Kind of precipitated silica | Nipsil AQ | ULTRASIL | B | C | Nipsil AQ | |
| Kind of natural rubber | | RSS #3 | | | Production Example 1 | Production Example 2 |
| Physical properties of precipitated silica | | | | | | |
| CTAB (m²/g) | 147 | 105 | 134 | 157 | 147 | 147 |
| Particle size distribution diameter $A_{ac}$ (nm) | 35 | 74 | 178 | 158 | 35 | 35 |
| −0.76 × CTAB + 274 | 162 | 194 | 172 | 155 | 162 | 162 |
| Ignition loss − heating loss (% by mass) | 2.3 | 3.3 | 2.6 | 2.1 | 2.3 | 2.3 |
| Rolling resistance (index) | 100 | 105 | 105 | 103 | 108 | 104 |
| Abrasion resistance (index) | 100 | 88 | 107 | 107 | 119 | 110 |
| Processability (index) | 100 | 90 | 88 | 92 | 105 | 101 |

Relation between CTAB of the precipitated silicas and the acoustic particle size distribution diameters $A_{ac}$ used in the examples and the comparative examples is shown in FIG. 1 by a graph. It can be found that in the precipitated silicas used in the examples, $A_{ac}$ is in an upper position than a straight line of $Y(A_{ac})=-0.76\times(CTAB)+274$ and satisfies the equation (I) described above and that on the other hand, the precipitated silicas used in Comparative Examples 1 and 2 have smaller $A_{ac}$. Further, it can be found from the results shown in Table 2 that in the precipitated silicas used in the respective examples, a difference between the ignition loss and the heating loss satisfies as well the equation (II) described above.

As apparent from the results shown in Table 2 and Table 3, it has been found that tires in which processability and low heat build-up are consistent with abrasion resistance to a high degree are obtained by using a rubber composition containing the precipitated silica and the modified natural rubber which satisfy the conditions of the present invention for a tire tread part.

The invention claimed is:

1. A tire prepared by using for a tire member, a rubber composition which contains a rubber component comprising a modified natural rubber containing a polar group in the rubber molecule and precipitated silica, wherein the precipitated silica is produced by a precipitation process and wherein in the precipitated silica, a cetyltrimethylammonium bromide-adsorbing specific surface area (CTAB) (m²/g) of the precipitated silica and the mode $A_{ac}$ (nm) in diameters of primary aggregates thereof determined by acoustic measurement of particle size distribution satisfy equation (I) shown below and the mode $A_{ac}$ is 1000 nm or less, and wherein in the precipitated silica, an ignition loss defined as mass reduction % when heated at 750° C. for 3 hours and a heating loss defined as mass reduction % when heated at 105° C. for 2 hours satisfy equation (II) shown below:

$$A_{ac} \geq -0.76\times(CTAB)+274 \quad (I)$$

$$(\text{ignition loss})-(\text{heating loss})\leq 3 \quad (II).$$

2. The tire as described in claim 1, wherein the precipitated silica has CTAB of 50 to 250 m²/g.

3. The tire as described in claim 1, wherein the precipitated silica is compounded in an amount of 10 to 150 parts by mass based on 100 parts by mass of the rubber component.

4. The tire as described in claim 1, wherein the polar group of the modified natural rubber is at least one selected from the group consisting of an amino group, an imino group, a nitrile group, an ammonium group, an imide group, an amide group, a hydrazo group, an azo group, a diazo group, a hydroxyl group, a carboxyl group, a carbonyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxysilyl group and a tin-containing group.

5. The tire as described in claim 1, wherein the polar group content of the modified natural rubber is 0.001 to 0.5 mmol/g based on the natural rubber component in the modified natural rubber.

6. The tire as described in claim 1, further containing a modified synthetic rubber as the rubber component.

7. The tire as described in claim 6, wherein the modified synthetic rubber is a polymer or a copolymer of a conjugated diene compound and/or an aromatic vinyl compound.

8. The tire as described in claim 6, wherein the modified synthetic rubber is modified at a molecular chain end.

9. The tire as described in claim 6, wherein the modified synthetic rubber is modified in the main chain.

* * * * *